United States Patent
Therene et al.

(10) Patent No.: US 11,467,991 B2
(45) Date of Patent: Oct. 11, 2022

(54) ARTIFICIAL INTELLIGENCE-ENABLED MANAGEMENT OF STORAGE MEDIA ACCESS

(71) Applicant: MARVELL ASIA PTE, LTD., Singapore (SG)

(72) Inventors: Christophe Therene, Livermore, CA (US); Nedeljko Varnica, San Jose, CA (US); Phong Sy Nguyen, Livermore, CA (US)

(73) Assignee: Marvell Asia PTE Ltd., Singapore (SG)

( * ) Notice: Subject to any disclaimer, the term of this patent is extended or adjusted under 35 U.S.C. 154(b) by 0 days.

(21) Appl. No.: 17/320,096

(22) Filed: May 13, 2021

(65) Prior Publication Data

US 2021/0271611 A1 Sep. 2, 2021

Related U.S. Application Data

(63) Continuation of application No. 16/664,528, filed on Oct. 25, 2019, now Pat. No. 11,010,314.

(Continued)

(51) Int. Cl.
*G06F 13/16* (2006.01)
*G06F 9/50* (2006.01)
(Continued)

(52) U.S. Cl.
CPC ........ *G06F 13/1668* (2013.01); *G06F 9/5094* (2013.01); *G06N 5/04* (2013.01); *G06N 20/00* (2019.01)

(58) Field of Classification Search
CPC .............. G06F 17/3056; G06N 99/005
See application file for complete search history.

(56) References Cited

U.S. PATENT DOCUMENTS 6,671,791 B1 12/2003 McGrath
9,015,351 B1 4/2015 Geddes et al.
(Continued)

FOREIGN PATENT DOCUMENTS

CN 1708742 12/2005
CN 106487719 3/2017
(Continued)

OTHER PUBLICATIONS

"International Preliminary Report on Patentability", Application No. PCT/IB2019/059194, dated Apr. 27, 2021, 9 pages.

(Continued)

*Primary Examiner* — Getente A Yimer

(57) ABSTRACT

The present disclosure describes apparatuses and methods for artificial intelligence-enabled management of storage media. In some aspects, a media access manager of a storage media system receives, from a host system, host input/output commands (I/Os) for access to storage media of the storage media system. The media access manager provides information describing the host I/Os to an artificial intelligence engine and receives, from the artificial intelligence engine, a prediction of host system behavior with respect to subsequent access of the storage media. The media access manager then schedules, based on the prediction of host system behavior, the host I/Os for access to the storage media of the storage system. By so doing, the host I/Os may be scheduled to optimize host system access of the storage media, such as to avoid conflict with internal I/Os of the storage system or preempt various thresholds based on upcoming idle time.

20 Claims, 20 Drawing Sheets

Related U.S. Application Data

(60) Provisional application No. 62/752,876, filed on Oct. 30, 2018.

(51) Int. Cl.
  *G06N 5/04* (2006.01)
  *G06N 20/00* (2019.01)
  *G06F 3/06* (2006.01)
  *G06N 3/04* (2006.01)
  *G06N 3/08* (2006.01)

(56) References Cited

U.S. PATENT DOCUMENTS

| | | |
|---|---|---|
| 9,747,039 B1 | 8/2017 | Coleman et al. |
| 10,228,874 B2 | 3/2019 | Wysocki et al. |
| 10,318,324 B2 | 6/2019 | Carson et al. |
| 10,956,346 B1 | 3/2021 | Ben-Yehuda et al. |
| 11,010,314 B2 | 5/2021 | Therene et al. |
| 11,055,232 B2 | 7/2021 | Keppel et al. |
| 11,074,013 B2 | 7/2021 | Salil et al. |
| 11,372,580 B2 | 6/2022 | Guo et al. |
| 2005/0182948 A1* | 8/2005 | Ducharme ............. G06F 21/10 713/189 |
| 2007/0260825 A1 | 11/2007 | Yudenfriend et al. |
| 2008/0100636 A1* | 5/2008 | Lai ........................... G09G 5/39 345/546 |
| 2008/0177974 A1 | 7/2008 | Chiang et al. |
| 2009/0077333 A1 | 3/2009 | Byrne et al. |
| 2010/0169382 A1 | 7/2010 | Sheaffer et al. |
| 2011/0154318 A1 | 6/2011 | Oshins et al. |
| 2012/0010772 A1* | 1/2012 | Pack ..................... G05D 1/0088 701/27 |
| 2012/0151178 A1 | 6/2012 | Brownlow et al. |
| 2012/0183001 A1 | 7/2012 | Suzuki et al. |
| 2012/0192178 A1 | 7/2012 | Brownlow et al. |
| 2013/0145231 A1 | 6/2013 | Frayer et al. |
| 2013/0179877 A1* | 7/2013 | Dain .......................... G06F 8/60 717/177 |
| 2013/0254146 A1* | 9/2013 | Ellis .................... G06Q 30/0202 706/46 |
| 2014/0089233 A1* | 3/2014 | Ellis ........................ G06N 5/02 706/11 |
| 2014/0096132 A1 | 4/2014 | Wang et al. |
| 2014/0143558 A1 | 5/2014 | Kuesel |
| 2014/0281106 A1 | 9/2014 | Saghi et al. |
| 2015/0317088 A1 | 11/2015 | Hussain et al. |
| 2015/0378884 A1 | 12/2015 | Nemazie et al. |
| 2016/0224248 A1 | 8/2016 | Choi et al. |
| 2016/0267016 A1 | 9/2016 | Lee et al. |
| 2016/0292007 A1 | 10/2016 | Ding et al. |
| 2016/0371014 A1 | 12/2016 | Roberts |
| 2017/0024132 A1 | 1/2017 | Jun et al. |
| 2017/0031816 A1 | 2/2017 | Lee et al. |
| 2017/0070241 A1 | 3/2017 | Kaku et al. |
| 2017/0123901 A1 | 5/2017 | Zhao et al. |
| 2017/0124463 A1* | 5/2017 | Chen ....................... A01D 91/04 |
| 2017/0149733 A1 | 5/2017 | Chastain et al. |
| 2017/0220410 A1 | 8/2017 | Kim et al. |
| 2017/0235510 A1 | 8/2017 | Hu et al. |
| 2017/0269876 A1 | 9/2017 | Mukhopadhyay et al. |
| 2017/0277573 A1 | 9/2017 | Huynh |
| 2018/0032249 A1 | 2/2018 | Makhervaks et al. |
| 2018/0088804 A1 | 3/2018 | Mummidi et al. |
| 2018/0181302 A1 | 6/2018 | Liu |
| 2018/0210754 A1 | 7/2018 | Vaish et al. |
| 2018/0217951 A1 | 8/2018 | Benisty et al. |
| 2018/0307622 A1 | 10/2018 | Smith et al. |
| 2018/0373450 A1 | 12/2018 | Ji et al. |
| 2019/0042799 A1 | 2/2019 | Durham et al. |
| 2019/0050295 A1 | 2/2019 | Ding et al. |
| 2019/0129656 A1 | 5/2019 | Bains et al. |
| 2019/0146823 A1 | 5/2019 | Rewaskar et al. |
| 2019/0266117 A1 | 8/2019 | Duncan et al. |
| 2019/0278620 A1 | 9/2019 | Korbar et al. |
| 2019/0354599 A1* | 11/2019 | Mital .................... G06N 20/00 |
| 2020/0004701 A1 | 1/2020 | Subbarao et al. |
| 2020/0042341 A1 | 2/2020 | Gupta et al. |
| 2020/0050385 A1 | 2/2020 | Furey et al. |
| 2020/0050403 A1 | 2/2020 | Suri et al. |
| 2020/0050470 A1 | 2/2020 | Guo et al. |
| 2020/0104056 A1 | 4/2020 | Benisty et al. |
| 2020/0133898 A1 | 4/2020 | Therene et al. |
| 2020/0225851 A1 | 7/2020 | Klein et al. |
| 2020/0286562 A1 | 9/2020 | Gorobets et al. |
| 2020/0310997 A1 | 10/2020 | Chen et al. |
| 2020/0371954 A1 | 11/2020 | Li et al. |

FOREIGN PATENT DOCUMENTS

| | | |
|---|---|---|
| JP | 2009251751 | 10/2009 |
| WO | 2020089759 | 5/2020 |

OTHER PUBLICATIONS

"Foreign Office Action", EP Application No. 19190611.4, dated Dec. 10, 2021, 8 pages.
"Notice of Allowance", U.S. Appl. No. 16/533,376, dated Feb. 24, 2022, 9 pages.
"EP Search Report", EP Application No. 19190610.6, dated Dec. 20, 2019, 11 pages.
"Extended European Search Report", European Application No. 19190611.4, dated Jan. 8, 2020, 12 pages.
"Extended European Search Report", European Application No. 20151268.8, dated May 18, 2020, 7 pages.
"Foreign Office Action", European Application No. 19190606.4, dated Jan. 28, 2021, 6 pages.
"International Search Report and Written Opinion", PCT Application No. PCT/IB2019/059194, dated Jan. 22, 2020, 14 pages.
"Non-Final Office Action", U.S. Appl. No. 16/664,528, dated Sep. 18, 2020, 11 Pages.
"Non-Final Office Action", U.S. Appl. No. 16/533,399, dated Dec. 10, 2020, 20 pages.
"Notice of Allowance", U.S. Appl. No. 16/664,528, dated Jan. 6, 2021, 9 pages.
"Notice of Allowance", U.S. Appl. No. 16/533,399, dated Mar. 23, 2021, 8 pages.
Wang, et al., "SWANS: An Interdisk Wear-Leveling Strategy for RAID-0 Structured SSD Arrays", ACM Transactions on Storage, vol. 12, No. 3, Article 10, Apr. 2016, 22 pages.
"Foreign Office Action", EP Application No. 19190610.6, dated Sep. 7, 2021, 8 pages.
"Non-Final Office Action", U.S. Appl. No. 16/533,376, dated Oct. 4, 2021, 29 pages.
Dunlap, "The Intel Sysret Privilege Escalation", XenProject, Jun. 13, 2012, 7 pages.
"Foreign Office Action", EP Application No. 19190606.4, dated Apr. 21, 2022, 8 pages.
"Non-Final Office Action", U.S. Appl. No. 16/737,137, dated Apr. 25, 2022, 10 pages.
"Non-Final Office Action", U.S. Appl. No. 16/533,243, dated Jun. 21, 2022, 8 pages.
"Foreign Office Action", Chinese Application No. 201910727158.1, dated Jul. 22, 2022, 5 pages.
"Notice of Allowance", U.S. Appl. No. 16/737,137, dated Jul. 28, 2022, 8 pages.

* cited by examiner

ARTIFICIAL INTELLIGENCE-ENABLED MANAGEMENT OF STORAGE MEDIA ACCESS

CROSS REFERENCE TO RELATED APPLICATION

This application is a continuation of and claims priority to U.S. Utility patent application Ser. No. 16/664,528 filed Oct. 25, 2019 which in turn claims priority to U.S. Provisional Patent Application Ser. No. 62/752,876 filed Oct. 30, 2018, the disclosures of which are incorporated by reference herein in their entireties.

BACKGROUND

Many computing and electronic devices include non-volatile memory for storing software, applications, or data of the device. Additionally, most users stream data or access services with their devices, such as multimedia content or social media applications, over data networks from various locations or on the move. With users' ever-increasing demand for data and services, storage providers have scaled up capacity and performance of storage drives to support the data access associated with these activities of users and other data storage clients. Typically, a storage drive of a device includes storage media to which data of the device is written and read from. To do so, the device may issue data access requests to the storage drive, which in turn writes the data to or reads the data from the storage media as specified by each request. Thus, storage drive performance generally depends on a rate at which the storage drive is able to complete the data access requests of the device or the storage client.

The storage media of the storage drive is not accessed solely based on the data access requests received from the device. The storage drive itself may implement various internal operations related to health or maintenance of the storage media. In conventional storage drives, access to the storage media associated with these internal drive operations is not planned and may conflict with access of the storage media for servicing the data requests of the device. Accordingly, when the internal operations of the storage drive result in conflicting access that interferes with data write operations or data read operations of the device, overall storage drive performance may degrade as data request latency increases and data throughput of the storage drive decreases.

SUMMARY

This summary is provided to introduce subject matter that is further described in the Detailed Description and Drawings. Accordingly, this Summary should not be considered to describe essential features nor used to limit the scope of the claimed subject matter.

In some aspects, a media access manager of a storage media system implements a method that receives, from a host system and via a host interface of a storage system, host input/outputs (I/Os) for access to storage media of the storage system. The media access manager provides information describing the host I/Os received from the host system to an artificial intelligence engine associated with the storage system. The media access manager receives a prediction of host system behavior with respect to subsequent access of the storage media by the host system from the artificial intelligence engine. Based on the prediction of host system behavior, the media access manager schedules the host I/Os for access to the storage media of the storage system.

In other aspects, an apparatus comprises a host interface configured for communication with a host system, storage media to store data of the host system, and a media interface configured to enable access to the storage media. The apparatus also includes an artificial intelligence engine and a media access manager that is configured to receive, via the host interface, host input/outputs (I/Os) from the host system for access to the storage media of the apparatus. The media access manager provides information describing the host I/Os received from the host system to the artificial intelligence engine. The media access manager then receives a prediction of host system behavior with respect to subsequent access of the storage media by the host system from the artificial intelligence engine. Based on at least the prediction of host system behavior, the media access manager schedules the host I/Os for access to the storage media of the apparatus.

In yet other aspects, a System-on-Chip (SoC) is described that includes a media interface to access storage media of a storage system, a host interface to communicate with a host system, and an artificial intelligence engine. The SoC also includes a hardware-based processor and a memory storing processor-executable instructions that, responsive to execution by the hardware-based processor, implement a media access manager to receive host input/outputs (I/Os) from the host system for access to the storage media of the storage system via the host interface. The media access manager provides information describing the host I/Os received from the host system to the artificial intelligence engine. The media access manager then receives a prediction of host system behavior with respect to subsequent access of the storage media by the host system from the artificial intelligence engine. Based on at least the prediction of host system behavior, the media access manager schedules the host I/Os for access to the storage media of the storage system.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of an artificial intelligence-enabled (AI-enabled) management of storage media access are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
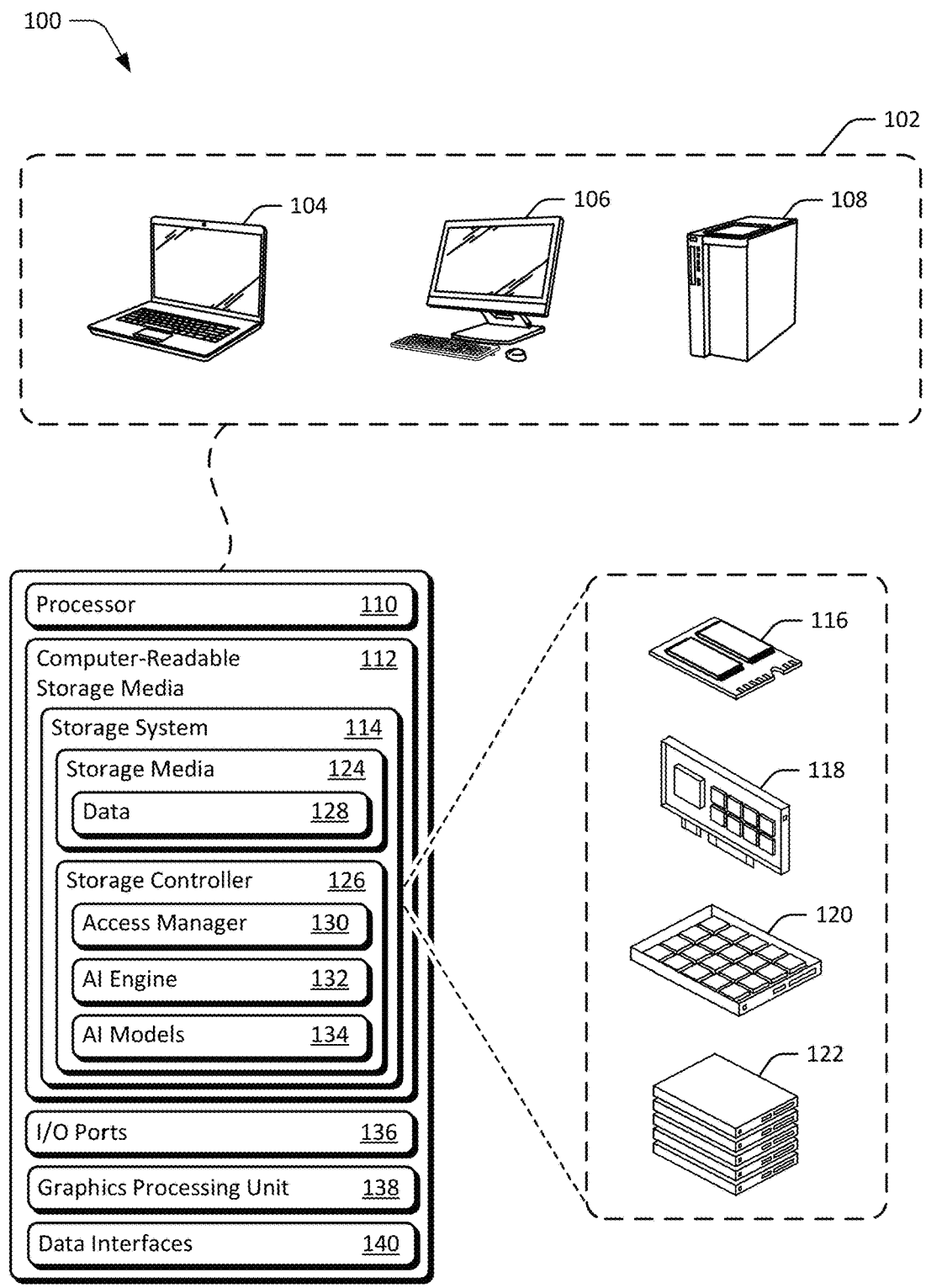
FIG. 1 illustrates an example operating environment having devices in which an AI-enabled storage media controller is implemented in accordance with one or more aspects of the disclosure.

Conventional techniques for managing access to storage media often result in conflicted or inefficient storage media access that degrades storage drive performance. Generally, storage drive firmware is used to manage a data path of the storage drive in an end-to-end manner, such as by translating data commands received from a device requesting access to data on the storage media. During operation, if storage media health or storage media maintenance issues arise, the firmware of the storage drive typically schedules storage media access to facilitate these internal tasks against the storage media access associated with the data commands of the device. The data commands of the device, which utilize resources of the storage media, may also further affect any ongoing health or maintenance issues of the storage media. In other words, the conventional techniques often schedule access to the storage media based on a current state of storage media health or storage media maintenance, which is a short-term or narrow view of storage drive needs and performance. As such, the conventional techniques for managing access often result in conflicted or inefficient access of the storage media, which degrades or reduces performance of the storage drive.

This disclosure describes apparatuses and techniques for AI-enabled management of storage media access. In contrast with conventional techniques of storage media access, the described apparatuses and techniques may implement AI-enabled-management of storage media access for efficient and coordinated scheduling of host input/outputs (I/Os) or internal I/Os for optimized storage drive performance. In some aspects, firmware of a storage controller (a media access manager) may use artificial intelligence (AI) models, running on native or dedicated AI hardware and/or firmware, for predictions or forecasts of activity that are useful by the firmware to manage storage media access and improve storage drive performance. For example, an AI engine using the AI models my predict relevant external events (e.g., host system activity) for internal firmware/software of the storage controller. The AI-enabled storage controller may determine when to perform internal storage controller-related tasks based on the predicted external events, rather than only a current device state or history of past events.

Generally, aspects of AI-enable management of storage media access may implement intelligent predictive and adaptive scheduling of host I/Os and/or internal I/Os through predicted host system behavior for a storage system (e.g., storage drive). In some cases, this may enable internal I/O scheduling that is optimized through AI-assisted prediction of events. In other cases, a media access manager may preempt, suspend, or disregard a threshold (e.g., garbage collection or thermal limit) to allow performance of host I/Os based on an upcoming idle time or projected decrease in host system activity. The media access manager and AI engine may also optimize various Flash translation layer (FTL) management operations (e.g. caching, migration, or garbage collection), as well as device-level tasks that include thermal management or power management for storage media devices.

In various aspects, the AI engine and AI models of the storage controller may predict specific idleness-related events (e.g., time to next idle, next idleness duration) of the host system, as well as host system I/O behavior (e.g., write density) or other parameters of storage media access. Generally, the AI engine of the storage controller may implement or manage multiple AI models, which may be loaded to AI hardware or AI firmware based on various internal tasks of a storage system that would benefit from AI assistance. In some cases, these multiple or different AI models run or execute concurrently on native or AI hardware to provide simultaneous AI assistance for multiple internal tasks. Alternately or additionally, the AI engine may perform online (run-time) re-training or refinement of an AI Model enable dynamic adaptation to user- or host system-specific I/O workloads.

In various aspects of AI-enabled management of storage media access, a media access manager of a storage media system receives host I/Os for access to storage media of the storage media system from a host system. The media access manager provides information describing the host I/Os received from the host system to an artificial intelligence engine. The media access manager then receives a prediction of host system behavior with respect to subsequent access of the storage media from the artificial intelligence engine. Based on the prediction of host system behavior, the media access manager then schedules the host I/Os for access to the storage media of the storage system. By so doing, the host I/Os may be scheduled to optimize host system access of the storage media, such as to avoid conflict with internal I/Os of the storage system or preempt various thresholds or parameters based on upcoming idle time.

The following discussion describes an operating environment, techniques that may be employed in the operating environment, and a System-on-Chip (SoC) in which components of the operating environment may be embodied. In the context of the present disclosure, reference is made to the operating environment by way of example only.

Operating Environment

FIG. 1 illustrates an example operating environment 100 having a host system 102, capable of storing or accessing various forms of data or information. Examples of a host system 102 may include a laptop computer 104, desktop computer 106, and server 108, any of which may be configured as user device, computing device, or as part of a storage network or cloud storage. Further examples of host system 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on. Generally, the host system 102 may communicate or store data for any suitable purpose, such as to enable functionalities of a particular type of device, provide a user interface, enable network access, implement gaming applications, playback media, provide navigation, edit content, provide data storage, or the like.

The host system 102 includes a processor 110 and computer-readable media 112. The processor 110 may be implemented as any suitable type or number of processors, either single-core or multi-core, for executing instructions or commands of an operating system or other applications of the host system 102. The computer-readable media 112 (CRM 112) includes memory (not shown) and a storage system 114 of the host system 102. The memory of the host system 102 may include any suitable type or combination of volatile memory or nonvolatile memory. For example, the volatile memory of host system 102 may include various types of random-access memory (RAM), dynamic RAM (DRAM), static RAM (SRAM) or the like. The non-volatile memory may include read-only memory (ROM), electronically erasable programmable ROM (EEPROM) or Flash memory (e.g., NAND Flash). These memories, individually or in combination, may store data associated with a user, applications, and/or an operating system of host system 102.

The storage system 114 of the host system 102 may be configured as any suitable type of data storage system, such as a storage device, storage drive, storage array, storage volume, or the like. Although described with reference to the host system 102, the storage system 114 may also be implemented separately as a standalone device or as part of a larger storage collective, such as a network-attached storage device, external storage drive, data center, server farm, or virtualized storage system (e.g., for cloud-based storage or services). Examples of the storage system 114 include a non-volatile volatile memory express (NVMe) solid-state drive 116, a peripheral component interconnect express (PCIe) solid-state drive 118, a solid-state drive 120 (SSD 120), and a storage array 122, which may be implemented with any combination of storage devices or storage drives.

The storage system 114 includes storage media 124 and a storage media controller 126 (storage controller 126) for managing various operations or functionalities of the storage system 114. The storage media 124 may include or be formed from non-volatile memory devices on which data 128 or information of the host system 102 is stored. The storage media 124 may be implemented with any type or combination of solid-state memory media, such as Flash, NAND Flash, RAM, DRAM (e.g., for caching), SRAM, or the like. In some cases, the data 128 stored to the storage media 124 is organized into files of data (e.g., content) or data objects that are stored to the storage system 114 and accessed by the host system 102. The file types, sizes, or formats of the data 128 may vary depending on a respective source, use, or application associated with the file. For example, the data 128 stored to the storage system 114 may include audio files, video files, text files, image files, multimedia files, spreadsheets, and so on. Although described with reference to solid-state memory, aspects of AI-enabled management of storage media access may also be implanted with magnetic-based or optical-based media types.

Generally, the storage controller 126 manages operation of the storage system 114 and enables the host system 102 to access the storage media 124 for data storage. The storage controller 126 may be implemented through any suitable combination of hardware, firmware, or software to provide various functionalities of the storage system 114. The storage controller 126 may also manage or administrate internal tasks or operations associated with the storage media 124, such as data caching, data migration, garbage collection, thermal management (e.g., throttling), power management, or the like. As such, the storage controller 126 may receive host I/Os from the host system 102 for data access and queue (or generate) internal I/Os associated with internal operations for the storage media 124. Generally, the storage controller 126 may perform media I/Os for access of the storage media 124 that correspond to scheduled host I/Os for data access and/or internal I/Os for internal operations or tasks associated with the storage media 124.

In this example, the storage controller 126 also includes a storage media access manager 130 (media access manager 130), an artificial intelligence engine 132 (AI engine 132) and artificial intelligence models 134 (AI models 134). In other configurations, the storage controller 126 may have access to an AI engine 132 or AI models 134 that are implemented separately from the storage controller 126. In various aspects, the media access manager 130 uses the AI engine 132 and AI models 134 to obtain predictions or forecasts of activity (e.g., host activity or inactivity) that are useful to manage storage media access, perform internal tasks, and improve storage drive performance. Generally, the media access manager 130 may implement intelligent predictive and adaptive scheduling (e.g., advance or delay) of host I/Os and/or internal I/Os through predicted host system behavior for a storage system (e.g., storage drive). In some cases, this may enable internal I/O scheduling that is optimized through AI-assisted prediction of events.

For example, the media access manager 130 may provide indications of host I/Os for storage media access to the AI engine 132. The AI engine 132 may use the indications of host I/O activity as inputs for the AI models 134 to predict or forecast subsequent host system behavior. Based on this prediction of host system behavior, the media access manager may schedule the host I/O and/or internal I/Os of the storage system 114, as well as adapt to user-specific workloads to improve performance of the storage system. The AI models 134 may include any suitable type of models, such as AI models based on recurrent neural network (RNN) architecture. AI models with an RNN type architecture may be configured with a memory for processing a history of inputs, making these models well suited for predicting host system behavior or future activity. An AI model 134 may predict host behavior through any suitable parameter, such as idleness-related parameters (e.g., time to next idle or next idle duration) or write density parameters (e.g., how much data is the host system expected to write for a given duration). How the media access manager 130, AI engine 132, and AI models 134 are implemented and used varies and is described throughout the disclosure.

The host system 102 may also include I/O ports 136, a graphics processing unit 138 (GPU 138), and data interfaces 140. Generally, the I/O ports 136 allow a host system 102 to interact with other devices, peripherals, or users. For example, the I/O ports 136 may include or be coupled with a universal serial bus, human interface devices, audio inputs, audio outputs, or the like. The GPU 138 processes and renders graphics-related data for host system 102, such as user interface elements of an operating system, applications, or the like. In some cases, the GPU 138 accesses a portion of local memory to render graphics or includes dedicated memory for rendering graphics (e.g., video RAM) of the host system 102.

The data interfaces 140 of the host system 102 provide connectivity to one or more networks and other devices connected to those networks. The data interfaces 140 may include wired interfaces, such as Ethernet or fiber optic interfaces for communicated over a local network, intranet, or the Internet. Alternately or additionally, the data interfaces 140 may include wireless interfaces that facilitate communication over wireless networks, such as wireless LANs, wide-area wireless networks (e.g., cellular networks), and/or wireless personal-area-networks (WPANs). Any of the data communicated through the I/O ports 136 or the data interfaces 140 may be written to or read from the storage system 114 of the host system 102 in accordance with one or more aspects of AI-enabled management of storage media access.

Figure 2:
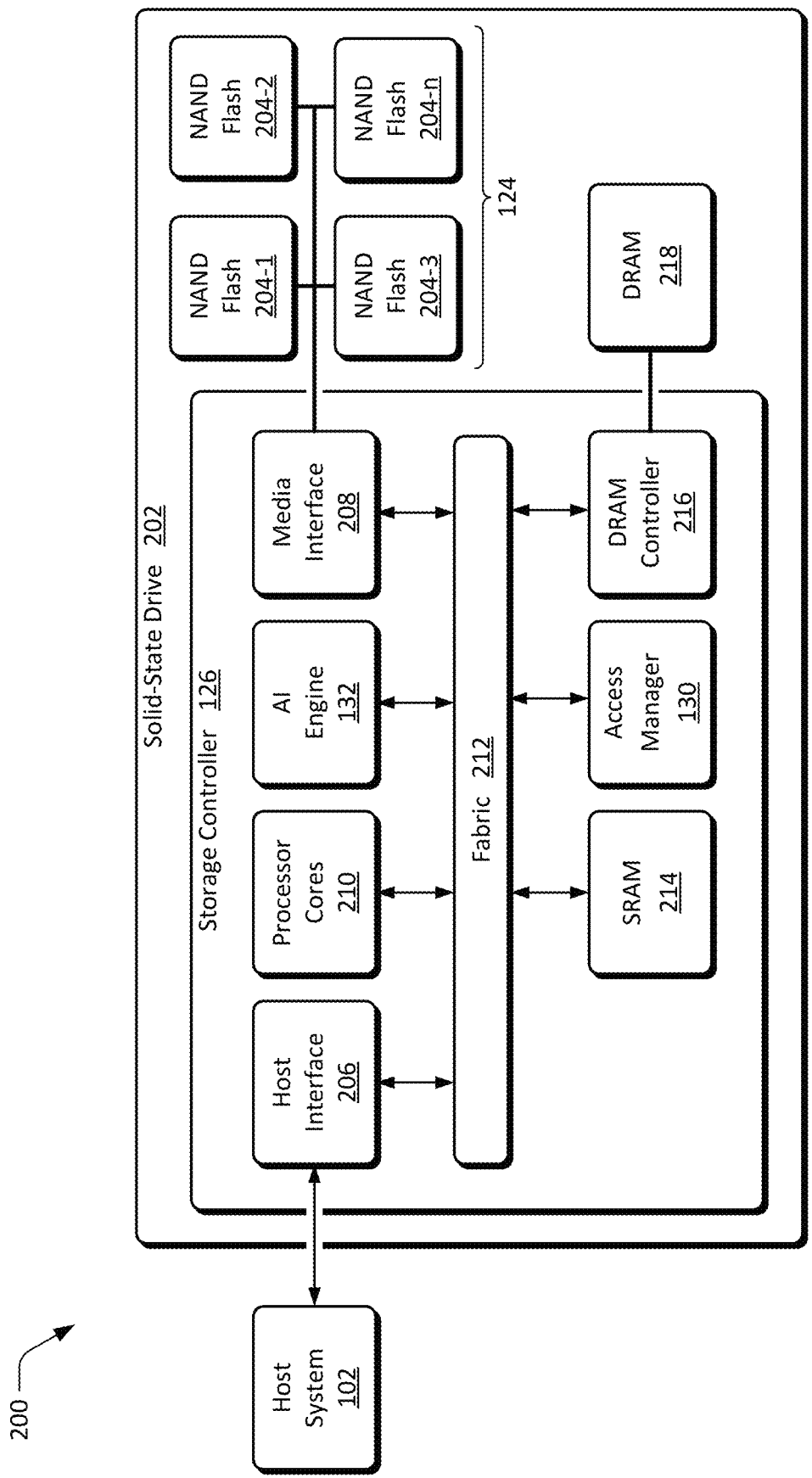
FIG. 2 illustrates example configurations of a media access manager and an AI engine of the storage controller shown in FIG. 1.

FIG. 2 illustrates example configurations of a media access manager 130 and AI engine 132 generally at 200, which are implemented in accordance with one or more aspects of AI-enabled management of storage media access. In this example, the media access manager 130 and AI engine 132 are illustrated in the context of a storage system 114 that is implemented as a solid-state storage drive (SSD) 202. The SSD 202 may be coupled to any suitable host system 102 and implanted with storage media 124 that includes multiple NAND Flash devices 204-1 through 204-n, where n is any suitable integer. In some cases, the NAND Flash devices 204 include multiple Flash channels of memory devices, dies, or chips that may be accessible or managed on a channel-level (group of devices) or device-level (individual devices). Although illustrated as components of the SSD 202, the media access manager 130 and/or AI engine 132 may be implemented separately from or external to a storage system 114. In some cases, the media access manager 130 or AI engine 132 are implemented as part of a storage media accelerator or aggregate storage controller coupled between a host system 102 and one or more storage systems 114.

Generally, operations of the SSD 202 are enabled or managed by an instance of the storage controller 126, which in this example includes a host interface 206 to enable communication with the host system 102 and a media interface 208 to enable access to the storage media 124. The host interface 206 may be configured to implement any suitable type of storage interface or protocol, such as serial advanced technology attachment (SATA), universal serial bus (USB), PCIe, advanced host controller interface (AHCI), NVMe, NVM-over Fabric (NVM-OF), NVM host controller interface specification (NVMHCIS), small computer system interface (SCSI), serial attached SCSI (SAS), secure digital I/O (SDIO), Fibre channel, any combination thereof (e.g., an M.2 or next generation form-factor (NGFF) combined interface), or the like. Alternately or additionally, the media interface 208 may implement any suitable type of storage media interface, such as a Flash interface, Flash bus channel interface, NAND channel interface, physical page addressing (PPA) interface, or the like.

In various aspects, components of the SSD 202 or storage controller 126 provide a data path between the host interface 206 to the host system 102 and the media interface 208 to the storage media 124. In this example, the storage controller 126 includes processor cores 210 for executing a kernel, firmware, or a driver to implement functions of the storage controller 126. In some cases, the processor cores 210 may also execute processor-executable instructions to implement the media access manager 130 or the AI engine 132 of the storage controller 126. Alternately or additionally, the media access manager 130 or the AI engine 132 may execute from or run on AI-specific hardware or processor cores.

As shown in FIG. 2, a fabric 212 of the storage controller 126, which may include control and data buses, operably couples and enables communication between the components of the storage controller 126. For example, the media access manager 130 or AI engine 132 may communicate with the host interface 206, processor cores 210 (e.g., firmware), or media interface 208 to exchange data, information, or I/Os within the storage controller 126. A static random-access memory 214 of the storage controller 126 may store processor-executable instructions or code for firmware or drivers of the storage controller, which may be executed by the processor cores 210. The storage controller 126 may also a dynamic random-access memory (DRAM) controller 216 and associated DRAM 218 for storage or caching various data as the storage controller 126 moves data between the host system 102, storage media 124, or other components of the storage controller.

Figure 3:
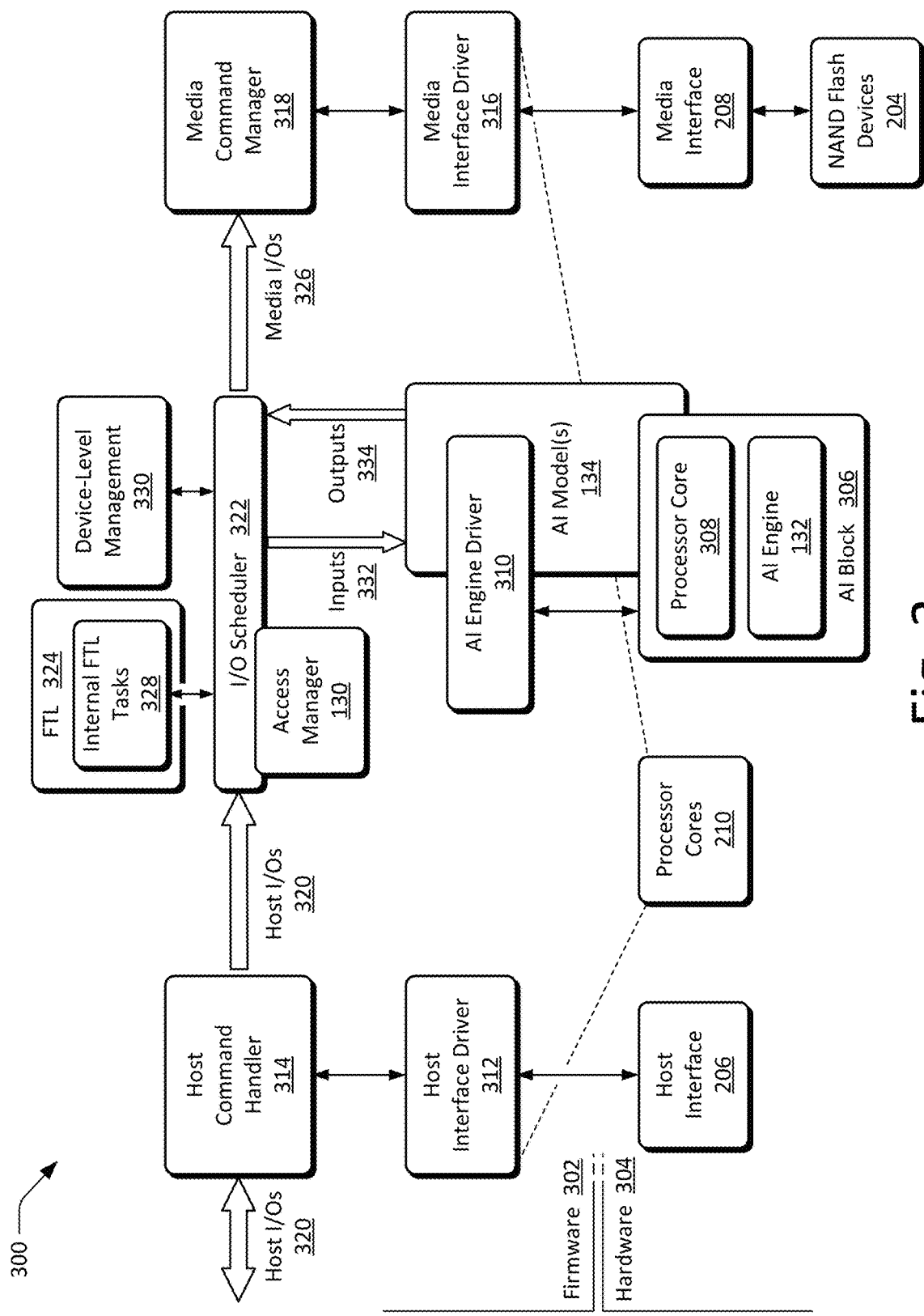
FIG. 3 illustrates example configurations of various hardware and firmware components for implementing an AI engine of a storage media controller.

FIG. 3 illustrates at 300 example configurations of various hardware and firmware components for implementing an AI engine of a storage media controller. In this example, the components of the storage controller 126 are shown as abstracted entities that may be implemented in firmware 302 or hardware 304 of the storage controller. This is but one example implementation of various components, any of which may be implemented separately from or in combination with other components described herein. Alternately or additionally, any of the components described with reference to FIG. 2 or FIG. 3 may be implemented as an intellectual property block (IP block) or IP core configured as a unit of logic, cell, and/or integrated-circuit (IC) that provides various described features of a component. For example, a component of the storage controller 126 (e.g., AI engine 132) may be implanted as an IP core or the IP block that includes a combination of hardware, firmware, or software to provide respective functionalities or implement respective operations of the component.

In this example, the hardware 304 of the storage controller 126 includes NAND flash devices 204, a host interface 206, a media interface 208, and processors 210, which may be implemented as described with reference to FIG. 2. In some aspects, the AI engine 132 is implemented as part of an AI block 306 (e.g., AI IP block) that includes a processor core 308 on which the AI engine 132 executes or runs. The AI engine 132 may also run one or more of the AI models 134 and provide an AI engine driver 310 by which the AI engine 132 interacts with the firmware 302 of the storage controller 126. Alternately or additionally, the AI engine 132 (e.g., light-weight AI engine 132 and models 134) may execute on the processor cores 210 of the storage controller 126 to provide the AI engine driver 310.

Generally, the firmware 302 of the storage controller 126 assists the hardware 304 to manage the data path between the host system 102 and storage media 124. In other words, the firmware 302 may translate commands or requests for data received from the host system 102 to enable access of the storage media 124. As shown in FIG. 3, the firmware 302 includes a host interface driver 312 to implement a host command handler 314 and a media interface driver 316 to implement media command manager 318. As shown in FIG. 3, host input/output commands 320 (host I/Os 320) are received by the host command handler 314 and sent to an I/O scheduler 322 of a Flash translation layer 324 (FTL 324) of the storage controller 126. The FTL 324 and/or I/O scheduler 322 may process and schedule the host I/Os 320, which may then be performed as corresponding media input/output commands 326 (media I/Os 326) for storage media access through the media command manager 318.

In various aspects, the FTL 324 manages command processing (e.g., host I/O 320 translation and scheduling) to facilitate movement of host system data within a storage system 114 and/or through a storage controller 126, such as to storage media 124. The FTL 324 may also monitor resources or health of the storage media 124 or storage media devices. For example, the FTL 324 may monitor the storage media 124 or cache DRAM 218 for an amount of free space, capacity, free blocks, bad blocks, write/programming cycle count, device/block wear pattern, power consumption, temperature, or the like. In some cases, the FTL 324 includes internal FTL tasks 328 (internal tasks 328) for management of storage media health and resources. These internal tasks 328 of the FTL 324 or storage controller 126 may include tasks or operations that access the storage media, such as data migration, garbage collection, wear leveling, or the like. To implement the internal tasks 328, the FTL 324 may generate internal I/Os for storage media access, which may then be performed as corresponding media I/Os 326 for storage media access through the media command manager 318.

In this example, the firmware 302 of the storage controller 126 also includes a device-level management 330 component to manage device-level aspects of the storage media 124. For example, the device-level management 330 component may monitor or manage parameters of individual ones of the NAND flash devices 204, NAND channels, memory chips, memory dies, physical memory blocks, or the like. In some cases, the device-level management 330 component monitors temperature conditions of the storage media 124 (e.g., die or device temperature) and implements thermal control (e.g., throttling) based on a predefined or adaptive temperature threshold. For example, the device-level management 330 component may delay or restrict access to a specific NAND device or NAND channel in response to a temperature of the NAND device or NAND channel exceeding the temperature threshold. Alternately or additionally, the device-level management 330 component may implement similar forms of power management (e.g., consumption-based) or other device-level monitoring and control of the storage media 124.

In aspects of AI-enabled management of storage media access, the media access manager 130 may interact with the AI engine 132 to optimize the processing and scheduling of various I/Os for access to the storage media 124. In some aspects, the media access manager 130 provides or forwards host I/Os 320 to an AI model 134 of the AI engine 132 as inputs 332. The inputs 332 may include any suitable type of data or information describing the host I/Os 320 (host system activity), such as an event type of the host I/O, an event duration of the host I/O, an event size of data associated with the host I/O, or the like. Based on the inputs 332, the AI model 134 generates or derives as outputs 334 a prediction of host system behavior. The outputs 334 or prediction of host may include any suitable type of data or information, such as an indication of a duration of time until the host system becomes idle, a duration of time for which the host system will remain idle, parameters regarding a next host I/O issued by the host system, or the like. The outputs 334 may be received by the media access manager 130 directly or through another entity, such as the I/O scheduler 322 or the FTL 324 of the storage controller 126. Using the prediction of host behavior, such as predicted host events (e.g., write density or idle times) or predicted host behavior information, the media access manager 130 may alter or modify how the host I/Os 320 and internal I/Os are processed, scheduled, or performed as media I/Os for storage media access.

For example, in the context of internal tasks 328, the media access manager 130 may provide information describing host I/Os 320 to the AI model 134 and receive from the AI model 134 a prediction of host system behavior with respect to subsequent access of the storage media 124. The media access manager 130 and I/O scheduler 322 may then use indications of storage media health and resources, as well as the prediction of host system behavior to process and schedule the host I/Os 320 (e.g., current and subsequently received host I/Os) and internal I/Os for the internal tasks 328 to optimize access of the storage media 124. By so doing, I/O scheduling may be improved by avoiding or reducing conflict between host I/Os and internal I/Os that compete for access to a same storage media resource.

As another example, consider AI-enabled management of storage media access in the context of device-level management operations, such as thermal-based throttling of storage media access. In addition to using current I/O workload or memory device states to determine a degree or amount of thermal throttling, the media access manager 130 may also use a prediction of host system behavior provided by an AI model 134 of the AI engine 132. In some cases, the media access manager 130 may alter or preempt (e.g., temporarily suspend) a thermal threshold of a memory device based on a predicted upcoming idle time, during which temperature of the memory device will cool during inactivity. Alternately or additionally, the media access manager 130 may reduce a degree to which storage media access is throttled based on the prediction of host system behavior. As such, having the ability to use this prediction of host system behavior may result in less throttling of storage media access, which in turn would improve host I/O performance. These are but a few examples of AI-enabled management of storage media access, other of which are enable and described throughout this disclosure.

Figure 4:
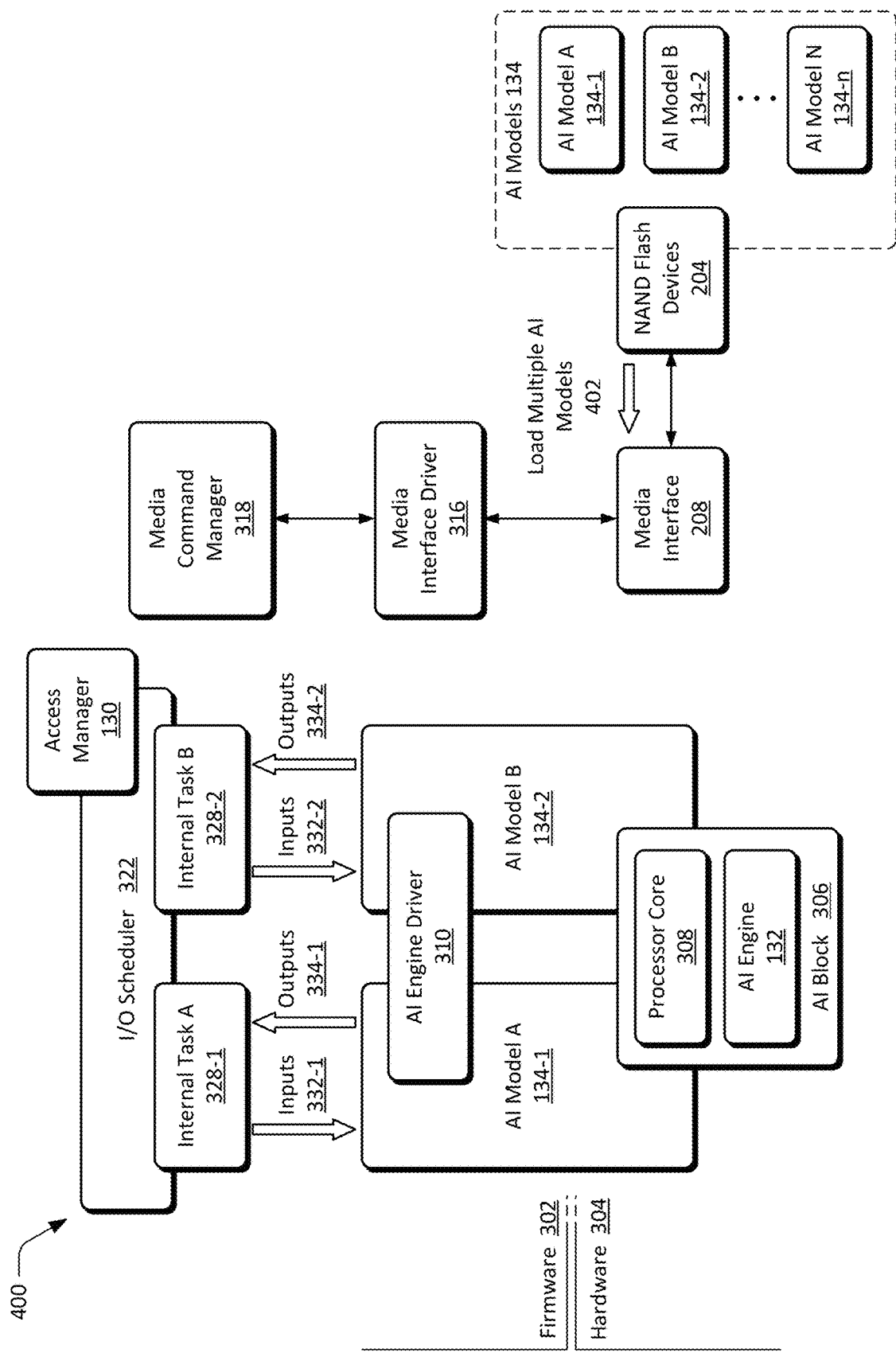
FIG. 4 illustrates an example configuration of an AI engine and persistent memory for implementing multiple AI models.

FIG. 4 illustrates at 400 an example configuration of an AI engine and persistent memory for implementing multiple AI models. In some aspects, an AI engine 132 may include or have access to multiple AI models 134 that are configured or trained to assist with or optimize different respective operations or tasks of a storage media controller. The AI models 134 may be stored in a persistent storage media of the storage system, such as the storage media 124 or an internal memory of the storage controller 126 (not shown). In this example, the AI models 134 are stored on the NAND flash devices 204, such as those implemented by the SSD 202 of FIG. 2. Here, the AI models 134 include multiple AI models, which are shown as AI model A 134-1 through AI model N 134-n, where n is any suitable integer. Each of the AI models 134 may be configured or trained for a respective internal task 328 or device-level operation of the storage controller, such as data migration, garbage collection, wear leveling, thermal control, or the like. Alternately or additionally, an AI model 134 may be configured or trained to assist with multiple internal tasks 328 of the FTL 324 storage controller 126.

As shown at 402, the media access manager 130 or AI engine 132 may load multiple AI models 134 to assist with and/or optimize internal tasks 328 of a storage system 114. In some cases, the multiple AI models 134 are loaded in response to the storage system 114 booting or powering up. In other cases, one or more of the AI models 134 may be loaded on-demand or as requested by the AI engine 132. Generally, an AI model 134 may be loaded to assist with or enable optimization of a corresponding internal task 328 of the storage system 114 or storage controller 126. In this example, assume the media access manager 130 or FTL 324 is running a first internal task A 328-1 (e.g., data migration) and a second internal task B 328-2 (e.g., garbage collection). Here, assume that the AI engine 132 loads both AI model A 134-1 and AI model B 134-2 via the media interface 208 when the storage system 114 boots up.

In the context of the present example, the AI model A 134-1 and AI model B 134-2 may be run sequentially or concurrently to assist with internal task A and/or internal task B of the storage controller. As shown in FIG. 4, the AI engine driver 310 may provide a first set of inputs 332-1 to the AI model A 134-1 and a second set of inputs 332-2 to the AI model B 134-2. The first set of inputs 332-1 may be the same, similar to, or different from the second set of inputs 332-2, such as configured differently for each internal task 328. To assist with the internal tasks, the AI model A provides a first set of outputs 334-1 to the I/O scheduler 322 or media access manager 130 and the AI model B 134-2 provides a second set of outputs 334-2 to the I/O scheduler 322 or media access manager 130. The first set of outputs 334-1 may be the same, similar to, or different from the second set of outputs 334-2, such as configured differently for each internal task 328.

Figure 5:
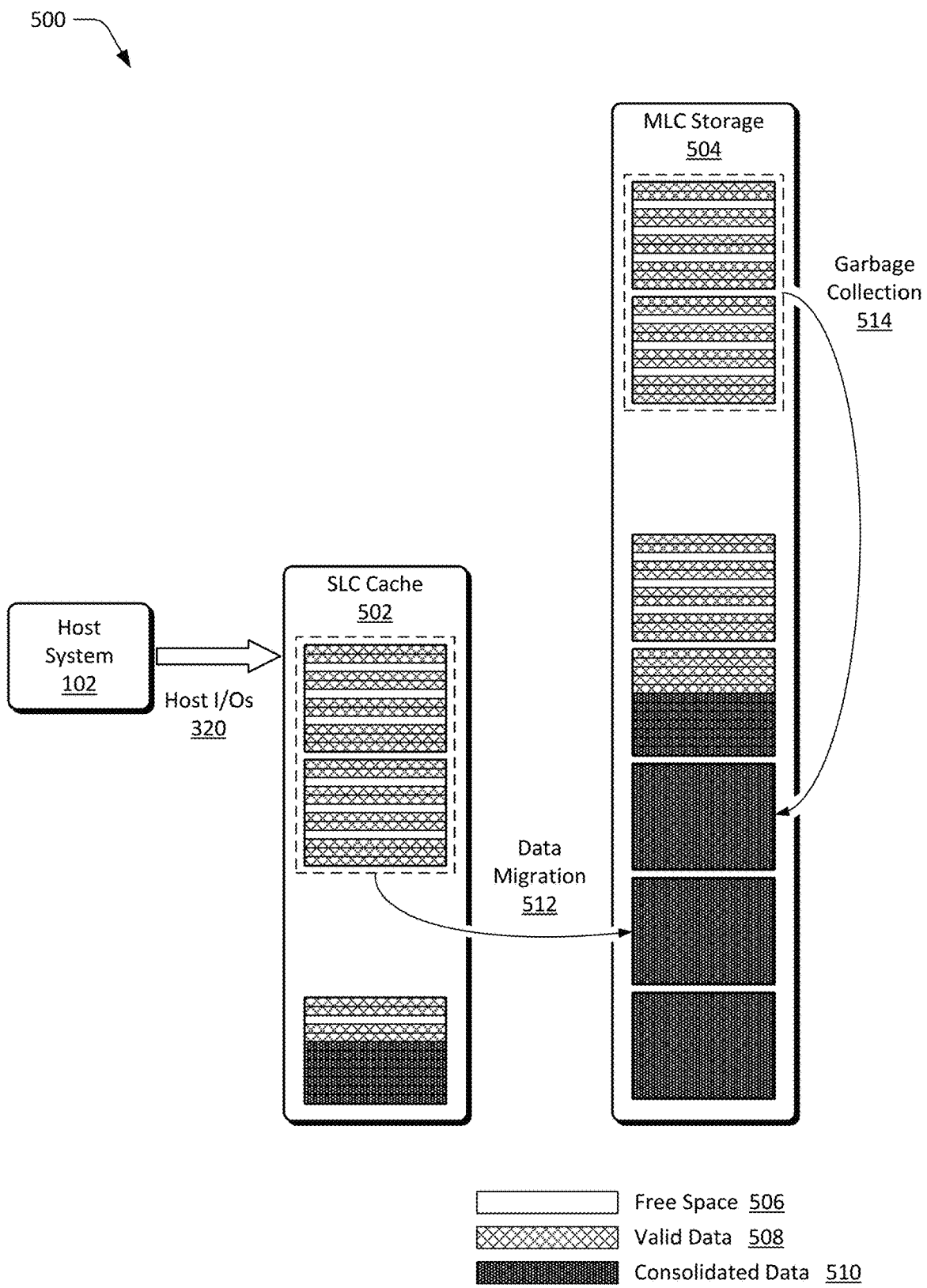
FIG. 5 illustrates example configurations of a cache memory and a storage memory through which aspects of AI-enabled management of storage media access may be implemented.

FIG. 5 illustrates at 500 example configurations of a cache memory and a storage memory through which aspects of AI-enabled management of storage media access may be implemented. In this example, a cache memory is illustrated as a single level cell (SLC) Flash cache 502, though other Flash or memory types may be used to cache data before writing to multi-level cell (MLC) Flash storage 504. The MLC storage 504 may also be implemented with other Flash or memory types, such as triple-level cell (TLC) Flash, quad-level cell Flash (QLC), XLC Flash, NOR Flash, or the like. Generally, a storage system 114 may be implemented with an SLC cache 502 for improved burst write performance or to reduce wear on the MLC storage media 504. The SLC Flash or other types of cache memory, however, may be more expensive than the storage media such that the SLC cache 502 is implemented with less capacity than a main storage area of MLC Flash memory.

As shown in FIG. 5, host I/Os 320 of the host system 102 may cause data to be written to free space 506 of the SLC cache 502 (host I/O to media I/O conversion is omitted here for visual brevity). The data of the host I/Os 320 may fill or occupy non-contiguous areas (e.g., partial pages or blocks) the SLC cache 502 as valid data 508 or consolidated data 510. In some cases, the valid data 508 is organized and moved within the SLC cache 502 to form the consolidated data 510. As the SLC cache 502 fills with data, the storage controller 126 migrates the valid data 508 or consolidated data 510 to the MLC storage 504 as shown at 512. Alternately or additionally, the host I/Os 320 may also cause data write directly to the MLC storage 504, bypassing the SLC cache 502.

As the MLC storage 504 fills with data, the storage controller 126 may implement garbage collection of partially valid MLC blocks to free these MLC blocks for reuse (e.g., enabling data writes as free MLC blocks) as shown at 514. As such, host I/Os 320 for data writes to the storage media may result in internal I/Os corresponding to data migration 512 and garbage collection 514 as performed by the storage controller 126 or FTL 324. In some cases, the internal I/Os for data migration 512 and garbage collection 514 arise concurrently with the host I/Os 320 received from the host system 102. When the internal I/Os are allowed to compete for access to the storage media (e.g., as corresponding media I/Os), host I/O performance, and thus overall host system performance, may be greatly impaired or reduced.

In aspects of AI-enabled management of storage media access the media access manager 130 may use the AI engine 132 in scheduling the host I/Os 320 and internal I/Os to optimize host I/O performance and reduce or eliminate contention between the host I/Os and internal I/Os for access to the storage media 124. Generally, the media access manager 130 may implement adaptive or optimized scheduling of host I/Os and internal I/Os utilizing predictions of host-related events and behavior. In other words, if future host I/O events or activities are predicted, based on past host system activity, scheduling of internal FTL operations may be optimized for predicted opportunities to avoid or reduce as many concurrent host I/Os and internal I/Os as possible. In various aspects, the media access manager 130 and/or AI engine 132 of a storage controller may implement predictive or adaptive internal tasks or device-level management for a storage system.

In some aspects, the media access manager 130 provides information to the AI engine 132 regarding current or past activity of a host system, such as information or descriptive data for read or write commands (e.g., logical block address (LBA), size, timestamp) or idle time (e.g., intervals, duty cycle, periodicity, frequency, duration, or the like). Based on the current or past host activity, the AI engine 132, using the AI models 134, may provide predictions of subsequent or future host activity, such as storage media access or idle time. A prediction of storage media access may include a type of access, an amount of data the host system will write or read, how long a write or read will take to complete, or which data is likely to be invalidated or overwritten in the future. Based on a prediction of future host system behavior, the media access manager 130 may alter scheduling of host I/Os or internal I/Os by advancing or delaying various I/Os to avoid or reduce contention for access to the storage media. By so doing, host I/O performance may be improved by efficiently masking or hiding execution of internal I/Os and taking advantage of host system idle time as perceived from the host system (e.g., desktop or laptop computing devices).

Figure 6:
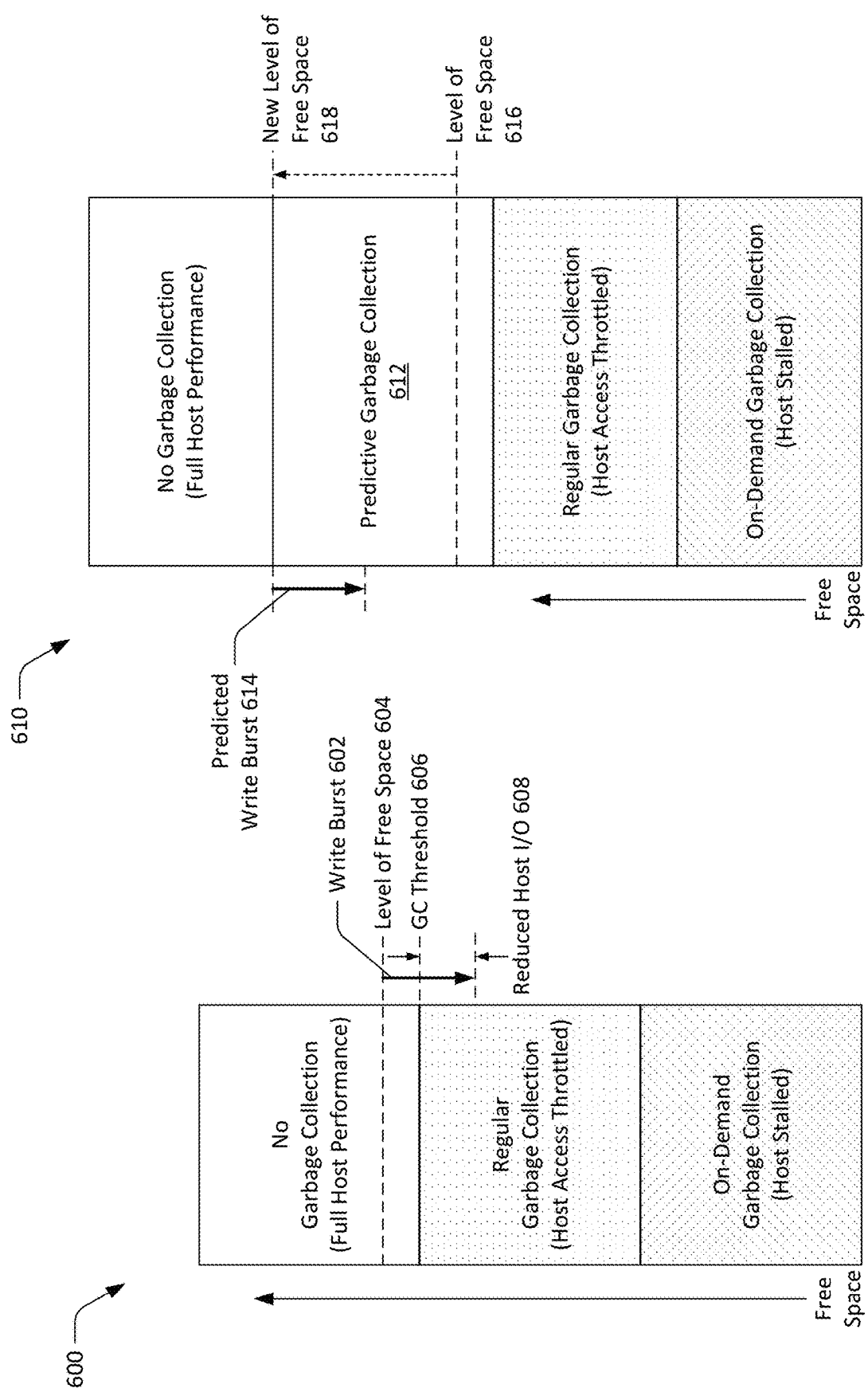
FIG. 6 illustrates an example of predictive garbage collection implemented with an AI engine of a storage system controller.

FIG. 6 illustrates an example of predictive garbage collection implemented by the media access manager 130 and with an AI engine 132 of a storage system controller. As shown at 600, host performance is degraded by throttling or stalling that occurs often with conventional garbage collection. Without AI-enabled management, garbage collection is typically run whenever a write burst 602 of the host exceeds a level of free space 604 of storage media. The incoming data associated with the write burst 602 causes the level of free space to fall below a garbage collection threshold 606, triggering the garbage collection that results in reduced host I/O performance 608 as internal I/Os for garbage collection compete with host I/Os of the write burst 602 for storage media access.

In contrast with conventional techniques, an example of predictive garbage collection enabled by the AI engine 132 and models 134 is shown at 610. In some aspects, a volume of storage media is configured with respective thresholds and free space to support predictive garbage collection 612 that may enable adaptive garbage collection operations that mitigate or avoid a reduction in host I/O performance (e.g., preventing host I/O throttling). Using the AI engine 132, the media access manager 130 may receive information relating to a predicted write burst 614 of a host system. The media access manager 130 may determine that the predicted write burst 614 exceeds a level of free space 616 and implement predictive garbage collection 612 internal I/Os before the predicted write burst 614 is expected to occur. By so doing, the predictive garbage collection 612 provides a new level of free space 618 that may receive (or absorb) data of the predicted write burst 614 or other write bursts without triggering regular garbage collection internal I/Os that would interfere with host I/Os of the write burst.

Figure 7:
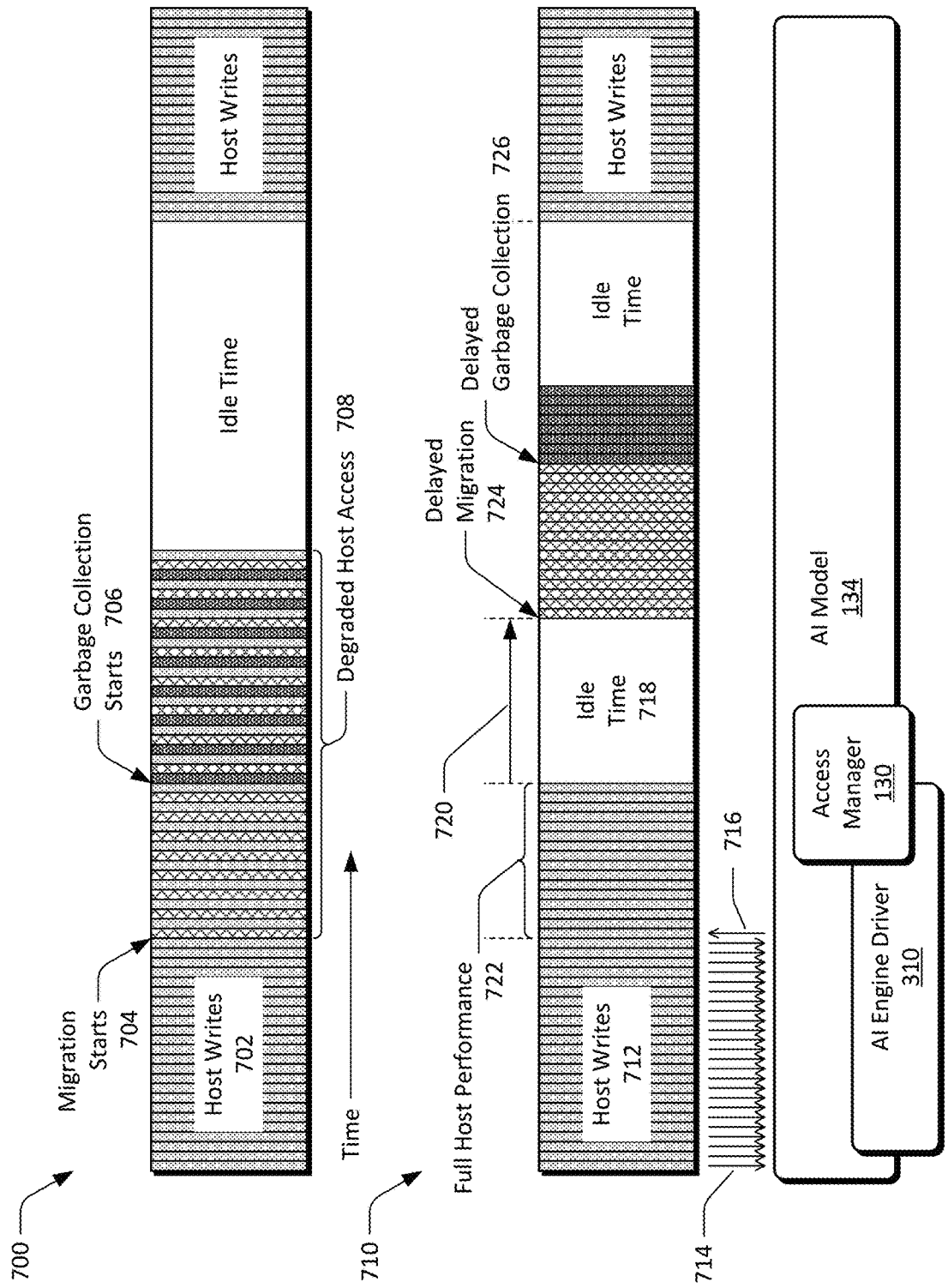
FIG. 7 illustrates an example of internal I/O operations scheduled by an AI engine in accordance with one or more aspects of the disclosure.

FIG. 7 illustrates an example of internal I/O operations scheduled by an AI engine in accordance with one or more aspects. In this example, a media access manager 130 may delay garbage collection and/or data migration to improve host I/O performance. As shown at 700, without AI-enabled management, host writes 702 may trigger data migration at 704 and then garbage collection at 706 as respective thresholds for each are encountered (e.g., as available free space decreases). When data migration and garbage collection are performed to free up blocks of storage media, the internal I/Os contend with host I/Os for access to the storage media interface and degrade host access as shown at 708.

In contrast with conventional techniques, an example of delayed garbage collection and/or data migration enabled by the AI engine 132 and IA models 134 is shown at 710. In some aspects, the media access manager 130 monitors host I/Os of a host system, which here include host I/Os for host writes 712 to storage media. Based on the host writes 712, the media access manager 130 may provide indications 714 of event types or durations to an AI model 134 of the AI engine driver 310. Based on the indications 714 of host activity, the AI model 134 provides a prediction of host system behavior at 716. The prediction of host system behavior may include information describing a next time to idle, next idle duration, a write density of host writes until the next idle of the host system, or the like. Based on a prediction of upcoming idle time 718, the media access manager 130 may delay internal tasks of the storage controller as shown at 720. Without competing internal I/Os of the FTL 324, full host performance is enabled at 722 relative where internal tasks of the storage controller would have degraded host I/O performance with a conventional storage controller. Using the prediction of idle time of the host system, the media access manager 130 may then implement delayed data migration 724 and delayed garbage collection 726 without conflicting with host I/Os of the host system.

Alternately or additionally, the media access manager 130 may implement adaptive cache management and dynamic bypass in accordance with one or more aspects. Similar to adaptive garbage collection and data migration, the media access manager 130 may use a prediction of host system behavior with respect to "write density" to manage use of a cache (e.g., SLC Flash cache) through preemptive (e.g., early) data migration to storage media (e.g., xLC Flash storage) or dynamic bypass of the cache. For example, based on a prediction of a large write burst, the media access manager 130 may perform early data migration from the cache memory to storage media to free enough space to absorb the write burst. In other cases, the media access manager 130 may determine that current idle time is insufficient for data migration and instead cause the large write burst to bypass the cache memory for writing directly to the storage media. This bypass data writing may be slower than using a cache memory of sufficient size, but avoids data migration from the cache memory, which if unable to absorb the entire write burst, would substantially degrade host I/O performance when concurrent data migration triggers (e.g., much slower than the bypass data writing).

Various aspects described throughout the disclosure may be implemented by a media access manager 130 or FTL 324 that interacts with an AI engine, AI models, or AI driver of or associated with a storage system. With respect to processing various information of a storage system, the AI engine 132 and/or AI models 134 may be implemented with machine-learning that is based on one or more neural networks for host system activity or behavior prediction. Each AI model, AI algorithm, or neural network of the AI engine 132 may include a group of connected nodes, such as neurons or perceptrons, which are organized into one or more layers.

By way of example, an AI model 134 (e.g., machine-learning model) of the AI engine 132 may be implemented with a deep neural network that includes an input layer, an output layer, and one or more hidden intermediate layers positioned between the input layer and the output layers of the neural network. Each node of the deep neural network may in turn be fully connected or partially connected between the layers of the neural network. An AI model or AI algorithm may be any deep neural network (DNN), such as a convolutional neural network (CNN) including one of AlexNet, ResNet, GoogleNet, MobileNet, or the like. Alternately or additionally, an AI model may include any suitable recurrent neural network (RNN) or any variation thereof. Generally, an AI model or AI algorithm employed by the AI engine 132 may also include any other supervised learning, unsupervised learning, reinforcement learning algorithm, or the like.

In various aspects, an AI model 134 of the AI engine 132 may be implemented as a recurrent neural network with connections between nodes forming a cycle to retain information from a previous portion of an input data sequence for a subsequent portion of the input data sequence (e.g., host I/Os or event descriptions). Alternately, an AI model may be implemented as a feed-forward neural network having connections between the nodes that do not form a cycle between input data sequences. In yet other cases, an AI model 134 of the AI engine 132 may include a convolutional neural network (CNN) with multilayer perceptrons where each neuron in a given layer is connected with all neurons of an adjacent layer. In some aspects, the AI model 134 based on a convolutional neural network may be applied to previous host system activity to predict or forecast some form of subsequent or future host system behavior or activity. Alternately or additionally, the AI engine 132 may include or utilize various regression models, such as multiple linear regression models, a single linear regression model, logistical regression models, step-wise regression models, multivariate adaptive regression models, locally estimated scatterplot models, or the like.

Figure 8:
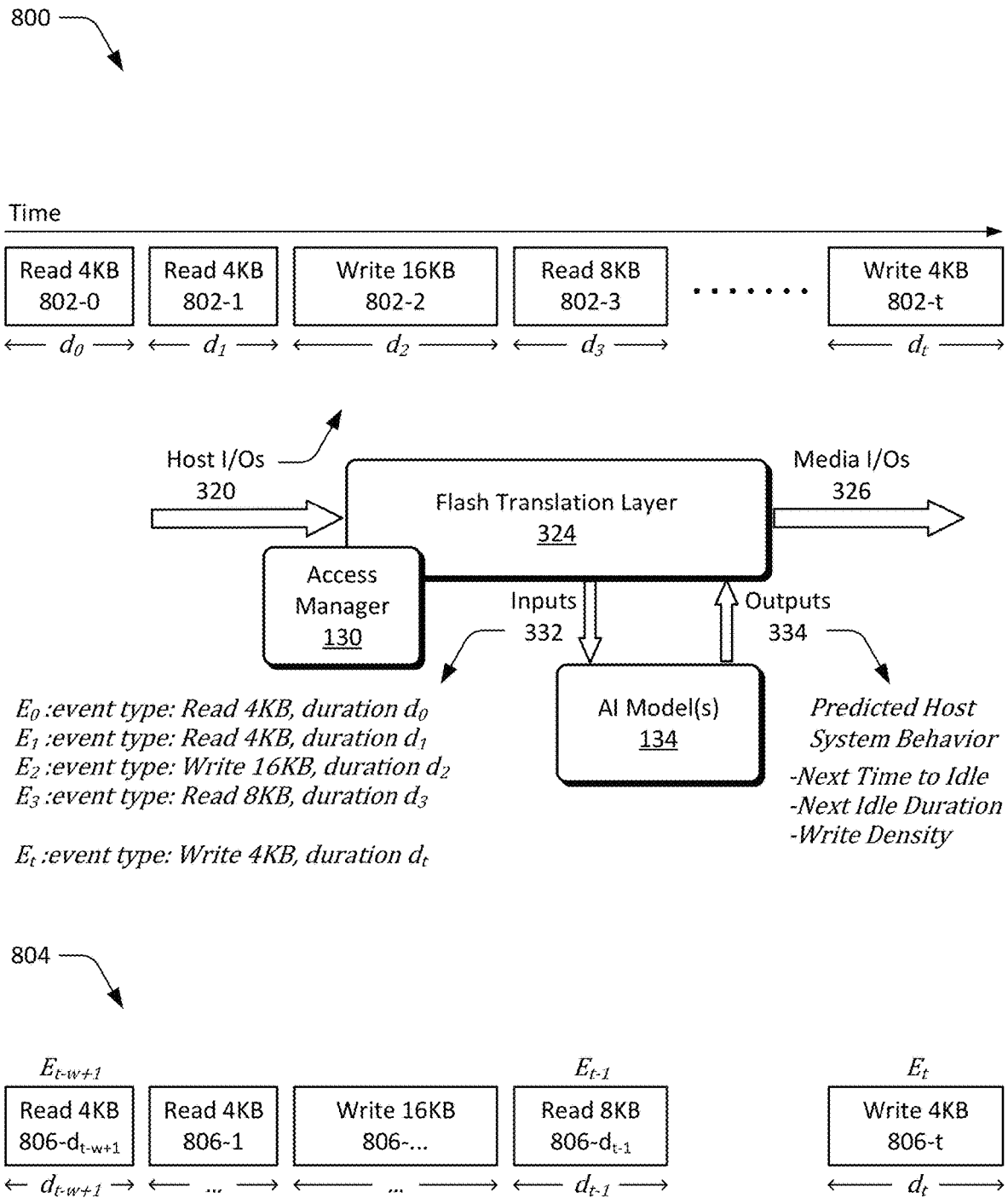
FIG. 8 illustrates example host I/O event types that are useful to an AI model predicting host system behavior in accordance with one or more aspects of the disclosure.

FIG. 8 illustrates at 800 example host I/O event types that are useful to an AI model in predicting host system behavior in accordance with one or more aspects. In this example, a Flash translation layer 324 is shown processing host I/Os 320 to generate corresponding media I/Os 326 for access to storage media 124. These host I/Os 320 may include or correspond to host I/O events 802-0 through 802-t for respective storage media access operations. Based on the host I/Os 320, the media access manager 130 provides inputs 332 to one or more of the AI models 134 of the AI engine 132. As shown in FIG. 8, the inputs 332 may include event descriptors or descriptions that include an event type, an event size, an event duration, an event timestamp, or the like. Based on the inputs 332 (e.g., host I/O events), the AI models 134 may generate or provide outputs 334 to the media access manager 130 for predicted host behavior. As shown in FIG. 8, the outputs 334 for predicted host behavior may include a next time to idle, next idle duration, write density (of subsequent host system access), or the like.

In some aspects, the media access manager 130 or FTL 324 forwards descriptions or descriptors of these I/O events to the AI models 134 for processing with a neural network configured to enable prediction of future host behavior or activity. In the context of the present example, the host I/O events 802 may be described or classified as shown in equation 1, where $x_t$ is an event type and $d_t$ is the duration of the event.

$$E_t=[x_t, d_t] \quad \text{Equation 1: Host I/O Event Descriptor Structure}$$

Generally, an event type or I/O command may be described with reference to a type of access (e.g., read/write) and size of the access (e.g., 4 KB, 8 KB, or 16 KB). An event duration ($d_t$) may be defined as a time from arrival of the event or I/O command until the arrival of a next or subsequent I/O command. With respect to idle event and idle time, if a duration of time associated with an event is longer than a predefined idle duration threshold (D), the event may be classified as "idle" and an associated duration time classified as "idle time". As shown at 804, an input sequence for the AI model 134 may be formed from multiple event descriptors 806 where at any step (t) a history of host I/O events may be defined as shown in equation 2.

$$E_{t-w+1}, E_{t-w+2}, \ldots E_{t-1}, E_t \quad \text{Equation 2: Host I/O Event History}$$

With an input sequence of host I/O events, a trained AI model 134 may be provided with an idle duration threshold with which to predict a the time to next idle ($\hat{u}_t$), next idle duration ($\hat{v}_t$), and write intensity ($\hat{s}_t$). By way of example, consider FIG. 9 which illustrates an example implementation of an AI model 900 configured to predict host I/O behavior. In various aspects, an AI model 134 may be based on recurrent neural network (RNN) architecture, which may prove advantageous in processing, with memory, a history of inputs like the I/O activity of a host system.

Figure 9:
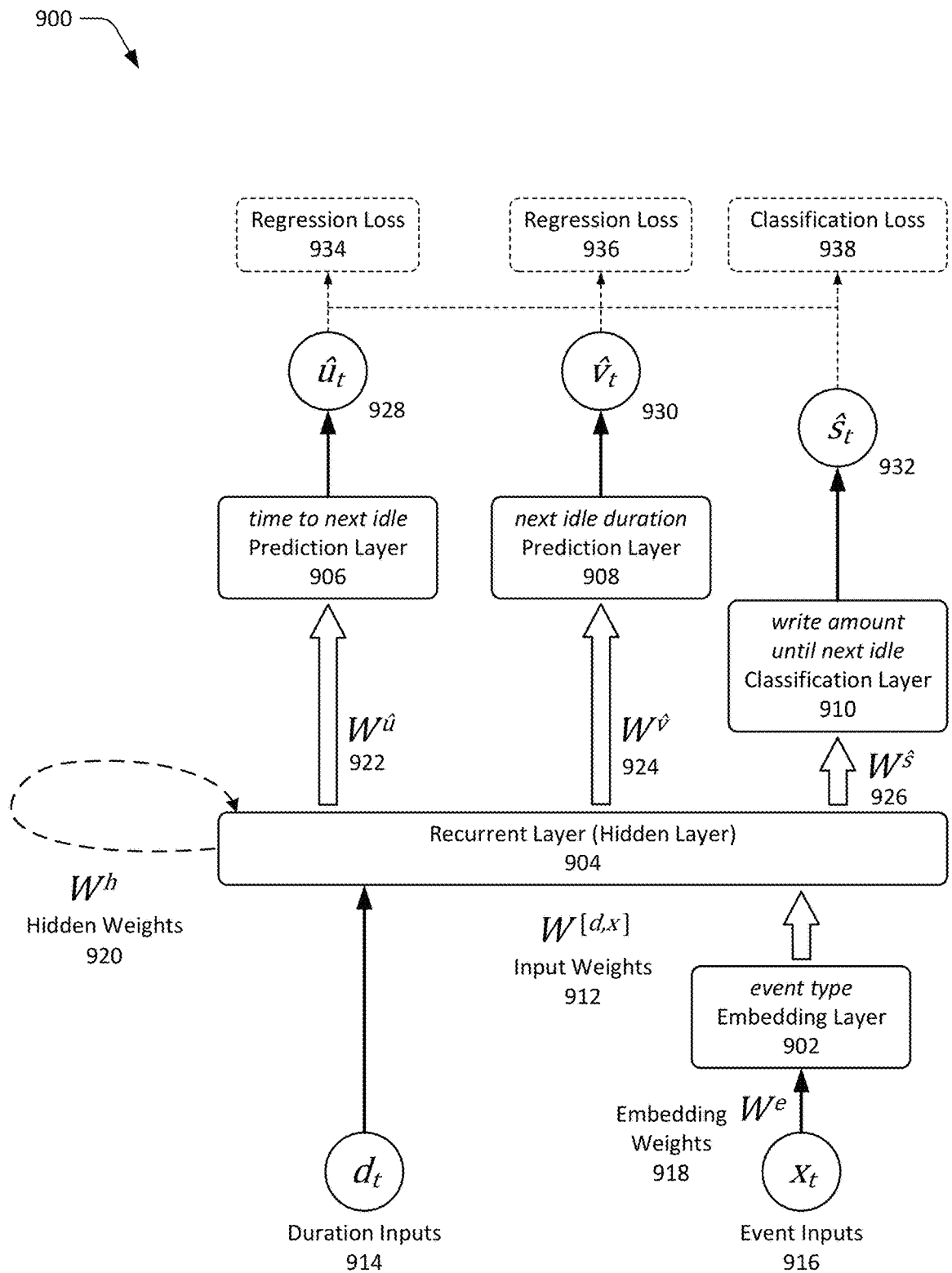
FIG. 9 illustrates an example implementation of an AI model configured to predict various aspects of host I/O behavior.

As shown in FIG. 9, the AI model 900 includes an embedding layer 902, recurrent layer 904, and respective prediction layers and classification layers 906 through 910 for "time to next idle", "next idle duration", and "write amount until next idle". In this example, input weights 912 of the AI model include duration inputs 914 and event inputs 916, which may be generated and formatted by the media access manager 130 as described herein. In some cases, embedding weights 918 are applied to the event inputs 916 at the embedding layer 902 prior to the recurrent layer 904. The recurrent layer 904 may also include hidden weights 920 which may be applied to connect an instance of the AI model 900 with a previous step or run of the AI model 900.

As shown in FIG. 9, the AI model 900 also includes respective weights 922 through 926 for predicting "time to next idle", "next idle duration", and "write amount until next idle". Similarly, any or all of the prediction layers or classification layer 906 through 910 may provide corresponding predictions 928 through 932 of host I/O activity quantities of "time to next idle", "next idle duration", and "write amount until next idle". Generally, regression loss functions 934 and 936, as well as a classification loss function 938, are used to train the model weights using back-propagation. Alternately or additionally, the AI model 900 may include an attention layer to enable the AI model to learn which weights or layers to attend based on a history of previous hidden states.

Figure 10:
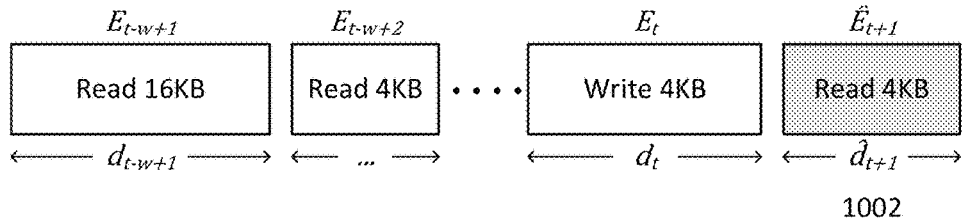
FIG. 10 illustrates examples of predicted host behavior including various I/Os or idle time.
Figure 10:
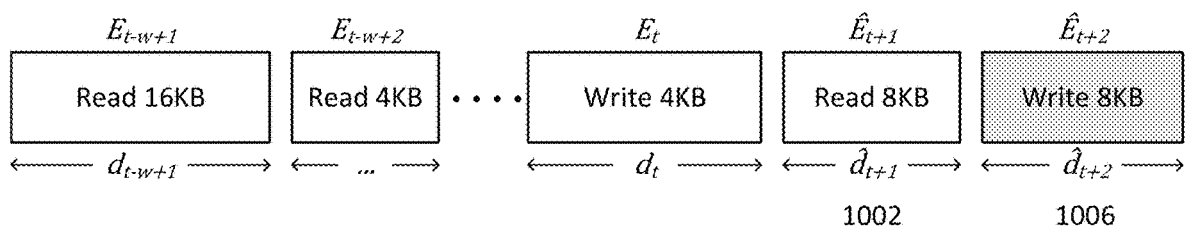
Figure 10:
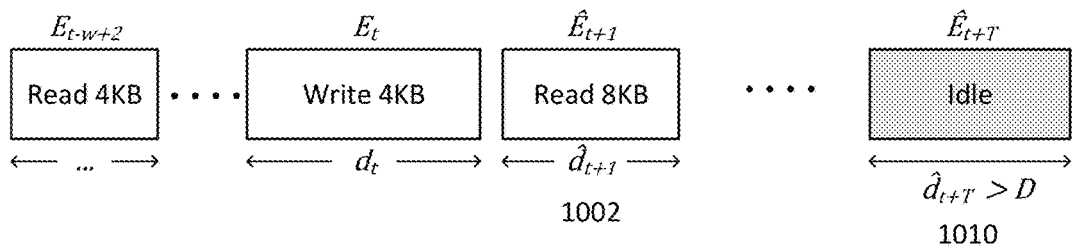

As another example of predicted host behavior, consider FIG. 10 which illustrates examples of predicted host behavior including various I/Os or idle time. In some aspects, a multi-stage approach may be implemented by an AI model 134 to predict a time to next idle, a next idle duration, and/or a write density of host I/O activity. As shown at 1000, the AI model 134 takes a history of w events as an input sequence to predict a next event 1002 $\hat{E}_{t+1}$ to serve as an intermediate result. Here, assume that the AI model 134 predicts a 4 KB read operation with 95% probability (shown as next event 1002) and an 8 KB write operation with 5% probability. Based on the input sequence, the AI model 134 may also predict a duration $\hat{d}_{t+1}$ for the next event 1002 (e.g., for the 4 KB read operation).

Figure 11:
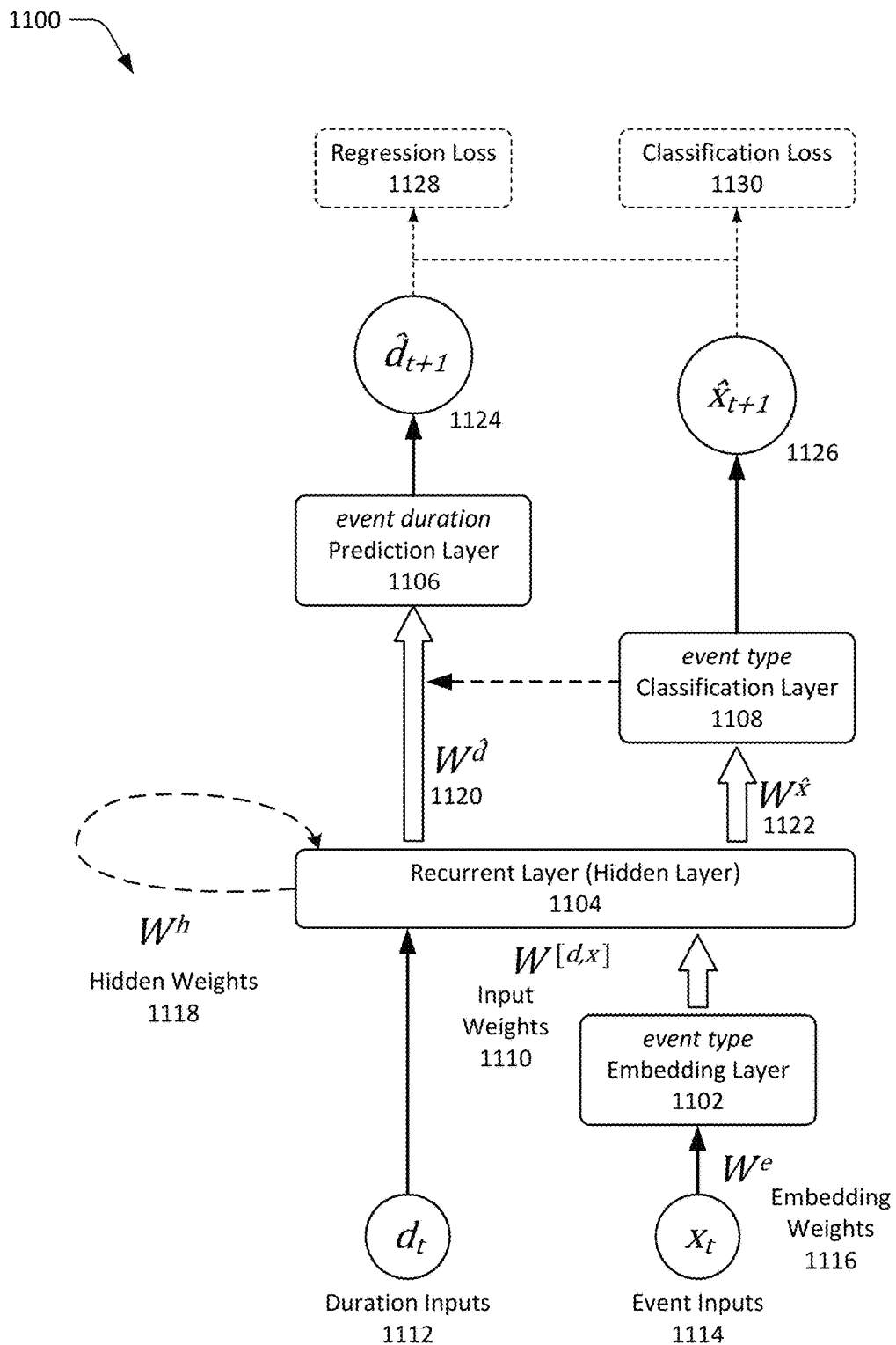
FIG. 11 illustrates an example implementation of an AI model that supports multi-stage prediction of host behavior.

This intermediate result, event 1002, may be provided back to the AI model 134 at 1004 as a next event of the input sequence in order to predict a next event 1006 $\hat{E}_{t+2}$. Here, assume that the next event 1006 may be predicted through probability to most likely be an 8 KB write of duration $\hat{d}_{t+2}$. This recursive approach of the AI model 134 may be performed and/or repeated until an idle time event is predicted. For example, the recursive approach is repeated as shown at 1008 until a step t+T 1010 where the predicted duration $\hat{d}_{t+T}$ is longer than a predefined idle duration threshold D, at which point an idle event is predicted, or step t+T reaches a predefined lookahead step S. If the recursive approach results in prediction of an idle event, a subsequent prediction stage may be used to predict other I/O-related quantities for host system activity, as shown in equations 3-5 below.

$$\text{predicted "time to next idle event"} = \hat{d}_{t+1} + \ldots + \hat{d}_{t+T-1} \quad [3]$$

$$\text{predicted "next idle duration"} = \hat{d}_{t+T} \quad [4]$$

$$\text{predicted "write density"} = \Sigma_j [\hat{E}_j]_{data\ size} \quad [5]$$

where
Equations $j=t+1, \ldots t+T$ such that $\hat{E}_j$ is a write event 3-5:
Quantities for predicted idle event-related host system behavior By way of example, consider FIG. 11 which illustrates an example implementation of an AI model 1100 configured for multi-stage prediction of host I/O behavior. As shown in FIG. 11, the AI model 1100 includes an embedding layer 1102, recurrent layer 1104, a prediction layer 1106, and classification layer 1108. In this example, input weights 1110 of the AI model 1100 include duration inputs 1112 and event inputs 1114, which may be generated and formatted by the media access manager 130 as described herein. In some cases, embedding weights 1116 are applied to the event inputs 1114 at the embedding layer 1102 prior to the recurrent layer 1104. The recurrent layer 1104 may also include hidden weights 1118 which may be applied to connect an instance of the AI model 1100 with a previous step or run of the AI model 1100.

As shown in FIG. 11, the AI model 1100 also includes "event duration" weights 1120 predicting various event durations and "event type" weights 1122 for classifying events, which may be provided to the prediction layer 1106. The prediction layer 1106 and classification layer 1108 may provide respective event predictions 1124 and event classifications 1126 for a next or intermediate event. Generally, regression loss function 1128 and classification loss function 1130 are used to train the model weights using back-propagation. Alternately or additionally, the AI model 1100 may include an attention layer to enable the AI model to learn which weights or layers to attend based on a history of previous hidden states.

Figure 12:
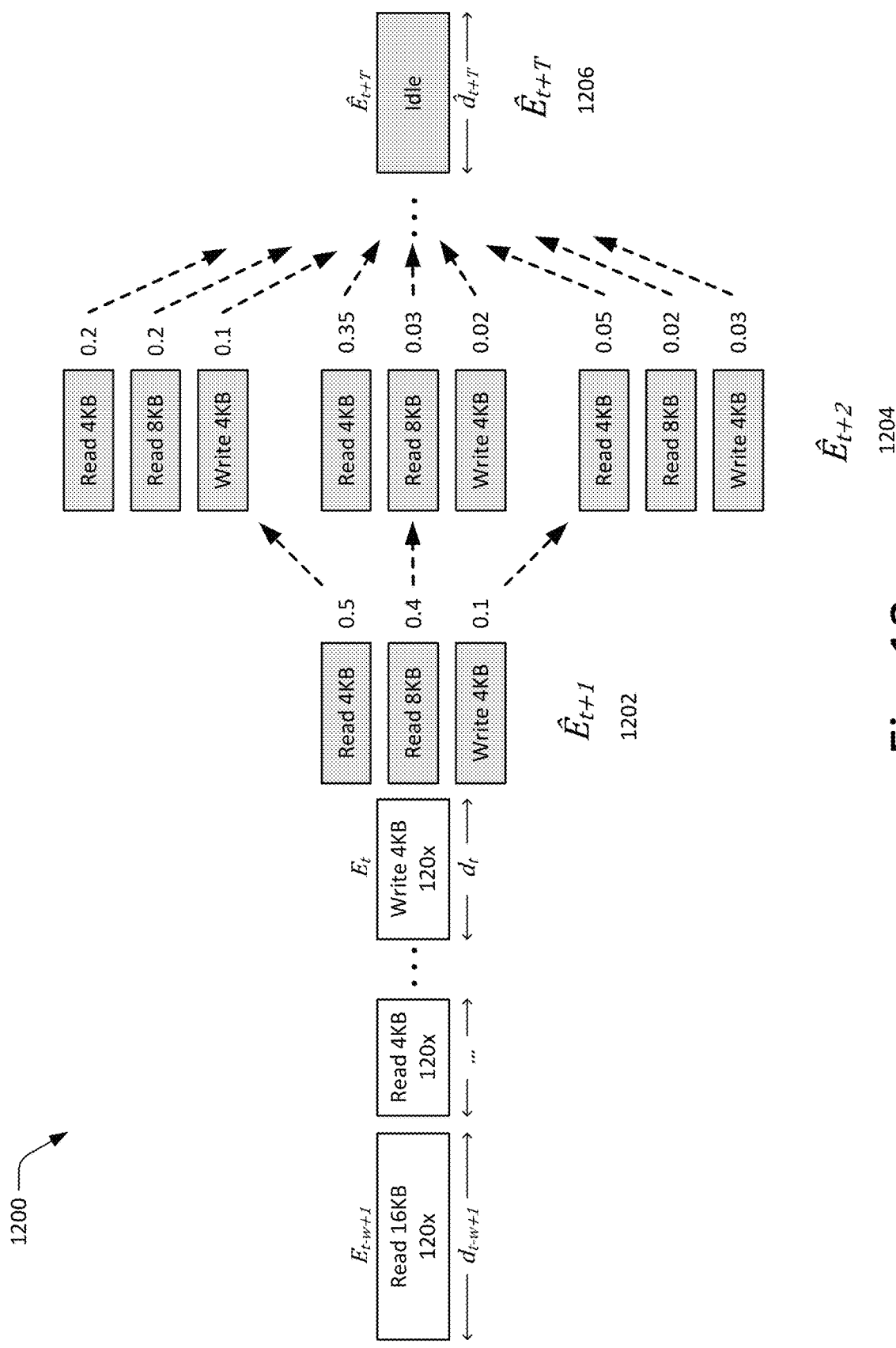
FIG. 12 illustrates an example beam search useful to determine a path of predicted host behavior based on event probability.

FIG. 12 illustrates at 1200 an example beam search useful to determine a path of predicted host behavior based on event probability. In some aspects, a beam search may be used to reduce or mitigate error propagation through predictions of host system behavior. Generally, at each time step, the beam search implemented by the media access manager 130 or AI engine 132 may keep K events with a highest joint or combined probability. By so doing, the beam search may increase a probability that the AI engine 132 selects a best path of events from time step t+1 to time step t+T. As shown in FIG. 12, for K=3 events, the beam search may proceed along paths from event $\hat{E}_{t+1}$ 1202 to event $\hat{E}_{t+2}$ 1204 based on assigned probabilities for each next event. Based on a chosen path from the beam search to idle event $\hat{E}_{t+T}$ 1206, the AI engine 132 may predict a "time to next idle event", "next idle duration", or "write density" using the AI models 134 as described herein.

Figure 13:
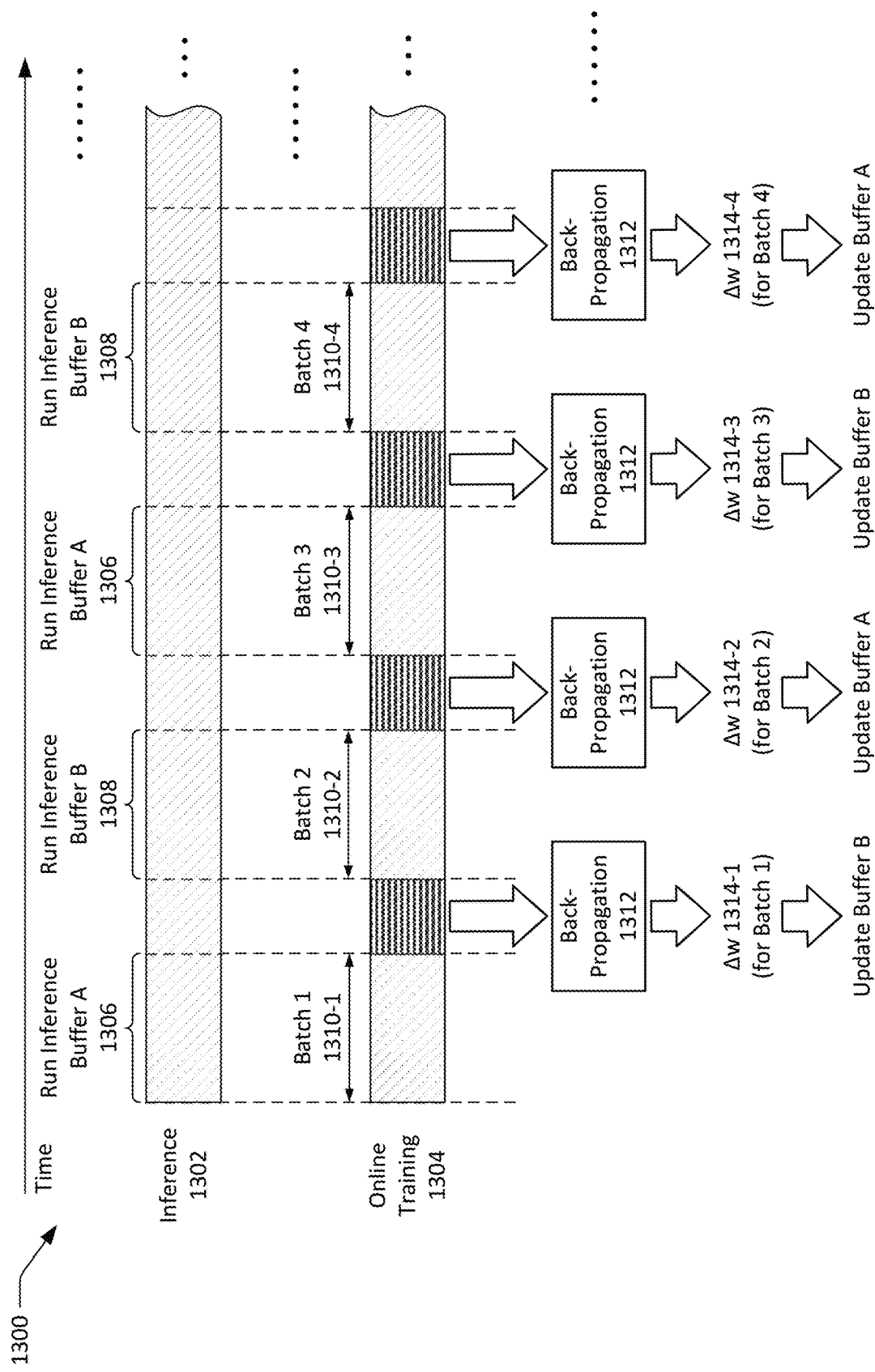
FIG. 13 illustrates an example timeline of operations for online re-training or online refinement of an AI model.

FIG. 13 illustrates at 1300 an example timeline of operations for online re-training or online refinement of an AI model, which may enable the AI model to adapt to a user- or device-specific I/O workload. Generally, an AI model used to predict host system I/O events or behavior may be trained offline using a large data set that is generic to a given type of device or application before deployment of a storage system to a user. Once the device is used by the user, various applications and day-to-day usage patterns typically vary from one user to the next. As such, effectiveness or accuracy of an AI model may be improved with online (e.g., run-time) refinement or re-training based on actual usage of the end user.

With respect to refining or retraining an AI model, the following discussion may apply to either as these operations may be implemented with same or similar operations. For example, an AI model may be refined when the AI model is robust or already trained for a sufficient length of time on data meaningful to a corresponding user. In other cases, the AI model may be retrained if the AI model is not accurate with respect to best parameters for a specific user of the device. Refinement of the AI model may include a partial update of model parameters, such as a number of layers in the model or modifying parameters in a given layer of a DNN. With respect to retraining, most or all of the AI model may be adjusted, such as with an introduction, extension, or removal of various parameters, weights, or layers of a DNN. In various aspects, the firmware of the storage controller 126, AI engine 132, or AI engine driver 310 may retrain or refine one or more of the AI models 134.

In some aspects, an inference process and online training on an AI model are performed concurrently or in parallel. The outputs provided by the inference process may be used for both predicting host system behavior and for online training purposes. To do so, the firmware of the storage controller or AI engine 132 may synchronize or coordinate steps of the inference process and online training to ensure a correct or optimal set of model weights is used during the concurrent online training process. Generally online training (or refinement) includes a forward step and a backward step, which may be performed or repeated as necessary. The forward step may be similar or same as an inference step. The backward step updates weights or parameters of the AI model being retrained through back-propagation. In some cases, back-propagation includes a calculation of how much or to what degree one or more of the model weights are modified. For example, the AI engine 132 may calculate a weight modifier ($\Delta w$) for each model weight and then add or subtract that weight modifier from the corresponding weight.

As shown in FIG. 13, when an AI model is trained or refined, two models or instances of the AI model may operate in parallel. In this example, an inference process 1302 runs concurrently or in parallel with online training 1304 of the AI model. Generally, one AI model may be designated as a "current model" and another AI model designated as an "update model", which provides retrained or improved model weights. The instances of the AI model may be implemented concurrently or in parallel through the use of multiple buffers that store respective versions of AI model parameters. With reference to FIG. 13, these buffers are labeled as buffer A 1306 and buffer B 1308. As shown in FIG. 13, the inference process 1302 may run continuously and the online training process 1304 may also run continuously with the exception of when weights are updated.

In some aspects, the inference process 1302 and online training 1304 execute on the same hardware (not shown) to run inference steps and online training processes. In other words, an inference part (or forward part) of the online training 1304 and the inference process 1302 may run on a same instance of the hardware illustrated in FIGS. 1-4 and/or other systems (e.g., FIG. 19) or controllers (e.g., FIG. 20) as described herein. For example, a single instance of inference hardware may be implemented to perform both the inference process 1302 and online training 1304 of FIG. 13. As shown in FIG. 13, the inference process 1302 may continue to run using weights of buffer B 1308 as weights of Buffer A 1306 are updated. Similarly, the inference process 1302 may continue to run using the weights of buffer A 1306 as the weights of buffer B 1308 are updated.

In the context of the present example, online training 1304 may be run based on a current AI model 134 in buffer A 1306. The AI engine 132 runs inference for one or multiple instances (steps) with the current AI model 134 or model weights in buffer A 1306 as one batch 1310 (e.g., batch 1 1310-1). On completion of a batch 1310, the AI model 134 is updated through back-propagation 1312, which may be implemented by a processor core of the AI engine 132 or the storage controller 126. Updating the AI model 134 or model weights in buffer B 1308 consumes time, during which the inference process 1302 may continue to run through the other instance of the AI model 134. As the weight modifiers 1314-1 of batch 1 1310-1 are updated in buffer B, the online training process 1304 may be locked (model parameter adjustment pauses) while the inference process 1302 continues to run on Buffer A. By so doing, the online training process 1304 can be implemented without degrading performance of the inference process 1302, while enabling quick and effective training of the AI model.

After back-propagation is complete and the AI model 134 or model weights in buffer B 1308 are updated, this buffer becomes the "current" buffer for a next batch of online training 1304 and for the inference process 1302. In other words, batch 2 1310-2 is run with the AI model 134 or model weights stored in buffer B 1308 and buffer A 1306 becomes the "update" buffer. As shown in FIG. 13, in alternating fashion buffer 1306 A holds the "current" model or model weights while buffer B 1308 is used as the "update" model or model weights. On completion of a model update, the buffer then switch roles in that buffer 1308 B holds the "current" model or model weights while buffer A 1306 is used as the "update" model or model weights. In other words, the online training "ping-pongs" between the buffers with each batch (e.g., batch 3, batch 4, and so on) to implement a continuous online training process. During the online or runtime training, the inference process 1302 may use the model or model weights of the "current" buffer to provide adaptive predictions of host system behavior. In other aspects, AI model refinement of retraining may be performed such that AI model training is implemented during a first set of time intervals and inference is performed in a second set of different time intervals.

Techniques for AI-Enabled Management of Storage Media Access

The following discussion describes techniques for AI-enabled management of storage media access, which may schedule host I/Os or internal I/Os to optimize performance of a storage drive. These techniques may be implemented using any of the environments and entities described herein, such as the media access manager 130, AI engine 132, and/or AI models 134. These techniques include various methods illustrated in FIGS. 14-18, each of which is shown as a set of operations that may be performed by one or more entities.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to implement AI-enabled management of storage media to schedule host I/Os and/or internal I/Os of a storage media system based on a prediction of host system behavior to optimize host system performance with respect to storage media access (e.g., latency or throughput). In portions of the following discussion, reference will be made to the operating environment 100 of FIG. 1 and various entities or configurations of FIGS. 2-13 by way of example. Such reference is not to be taken as limiting described aspects to the operating environment 100, entities, or configurations, but rather as illustrative of one of a variety of examples. Alternately or additionally, operations of the methods may also be implemented by or with entities described with reference to the System-on-Chip of FIG. 19 and/or the storage system controller of FIG. 20.

Figure 14:
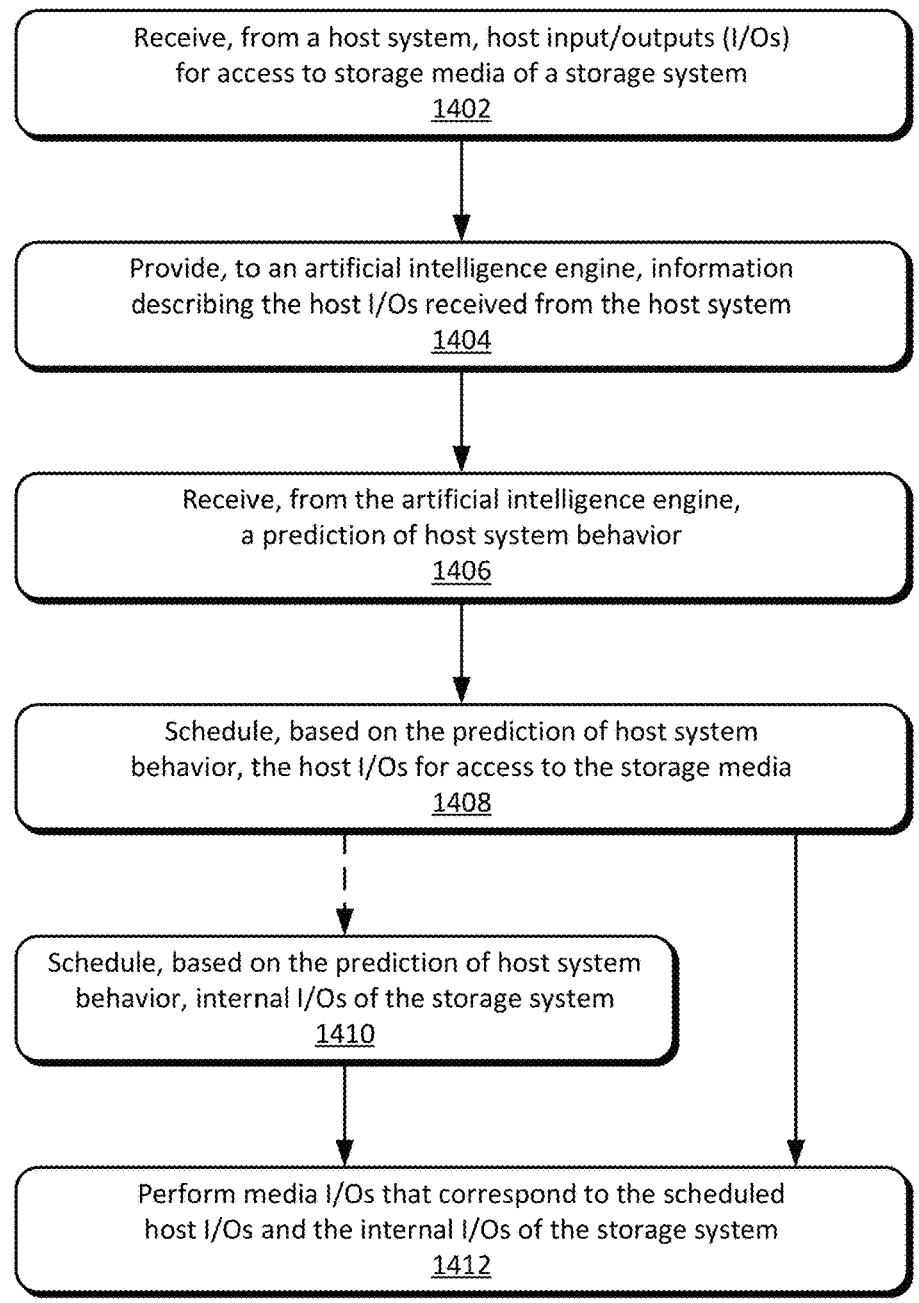
FIG. 14 depicts an example method for AI-enabled management of storage media access in accordance with one or more aspects of the disclosure.

FIG. 14 depicts an example method 1400 for AI-enabled management of storage media access, including operations performed by or with the media access manager 130 or AI engine 132 of a media storage controller.

At 1402, host I/Os for access to storage media are received from a host system. The host I/Os may be received from a host system via a host system interface of a storage system or storage controller. In some cases, the host I/Os include or correspond to write or read commands of the host system that include a respective logical block address, size, or timestamp.

At 1404, information describing the host I/Os of the host system are provided to an AI engine. The AI engine may be associated with the storage system, as part of a storage controller or accessible by the storage controller of the storage system. In some cases, the information describing or descriptors of the host I/Os includes an event type of the host I/O, an event duration of the host I/O, or an event size of data associated with the host I/O.

At 1406, a prediction of host system behavior is received from the AI engine. The prediction of host system behavior may include information describing host system activity with respect to subsequent access of the storage media by the host system. In some cases, the prediction of host system behavior includes an indication of a duration of time until the host system becomes idle, a duration of time for which the host system will remain idle, or parameters regarding a next host I/O issued by the host system.

At 1408, the host I/Os for access to the storage media are scheduled based on the prediction of host system behavior. The host I/Os may be scheduled to preempt other I/Os of internal tasks of the storage system. In some cases, the host I/Os are scheduled or performed with modified parameters or thresholds for garbage collection, caching, data migration, or thermal throttling. For example, the media access manager may suspend or preempt one or more thresholds to prevent internal storage system operations from triggering to enable completion of the host I/Os.

Optionally at 1410, internal I/Os of the storage system are scheduled based on the prediction of host system behavior. In some cases, the media access manager determines that the storage system has internal I/Os that are pending. The scheduling of the internal I/Os may include advancing or delaying the internal I/Os of the storage system based on the prediction of host system behavior, such as to mitigate contention between the internal I/Os and the host I/Os or subsequent host I/Os for access to the storage media.

At 1412, media I/Os that correspond to the scheduled host I/Os and/or internal I/Os of the storage system are performed. The FTL of the storage controller may generate respective media I/Os that correspond to the scheduled host I/Os and the internal I/Os of the storage system. In response to the media I/Os, the storage system may return read data to the host system or store data of the host system to the storage system.

Figure 15:
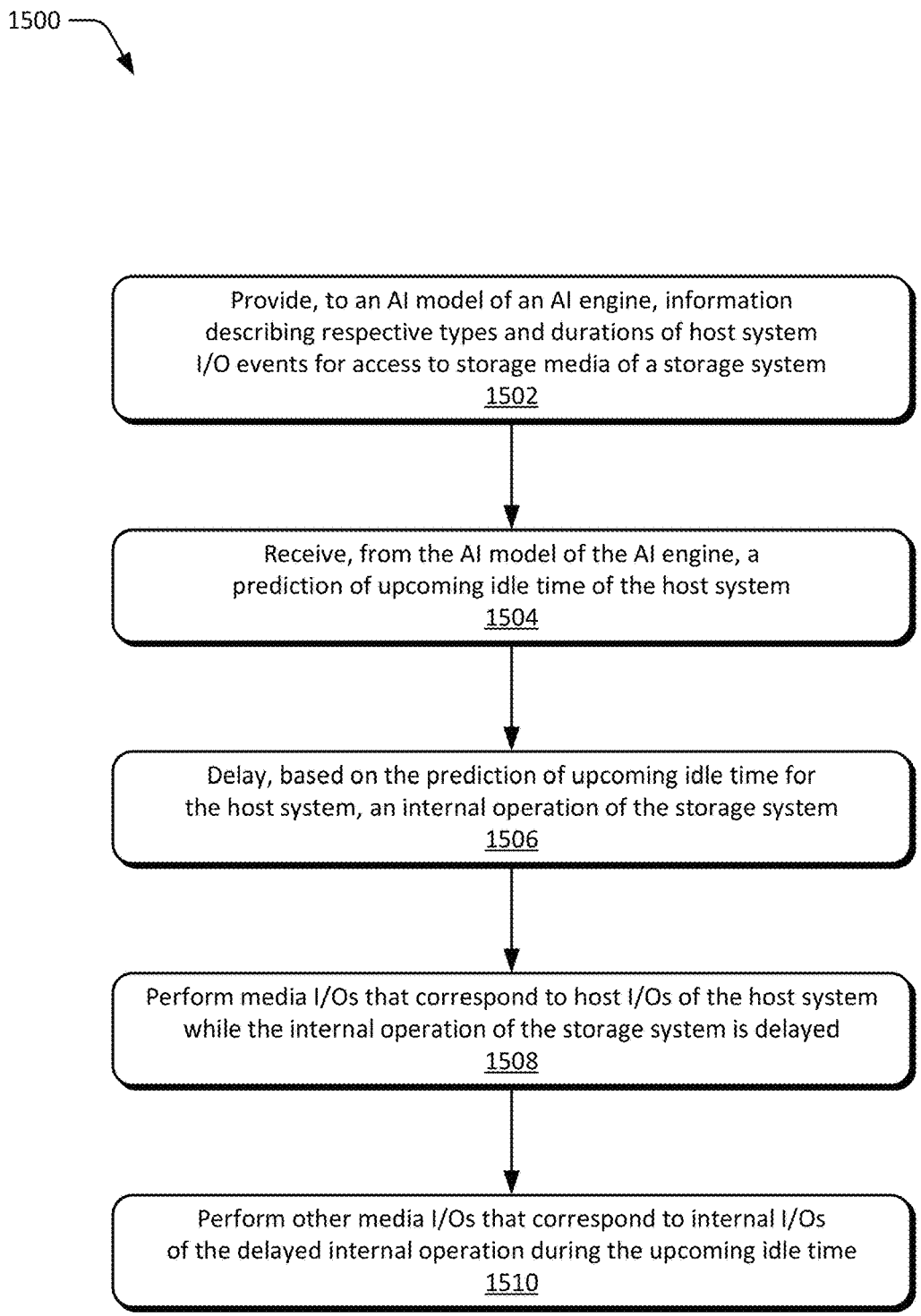
FIG. 15 depicts an example method for delaying an internal operation of a storage system based on a prediction of host system behavior.

FIG. 15 depicts an example method 1500 for delaying an internal operation of a storage system based on a prediction of host system behavior. In some aspects, the media access manager 130 or the AI engine 132 of a media storage controller perform the operations of the method 1500.

At 1502, information describing respective types and durations of host I/O events are provided to an AI model of an AI engine. The host I/O events may specify or request access to storage media of a storage system with which the AI engine is associated. In some cases, the information describing (or descriptors) of the host I/Os events includes an event type of the host I/O, an event duration of the host I/O, or an event size of data associated with the host I/O.

At 1504, a prediction of upcoming idle time of the host system is received from the AI model of the AI engine. The prediction of the upcoming idle time may include an indication of a duration of time until the host system becomes idle, a duration of time for which the host system will remain idle, or parameters regarding a next host I/O issued by the host system. In some cases, the prediction includes an indication of expected host I/O activity that is likely to occur before the next idle time of the host system.

At 1506, an internal operation or internal task of the storage system is delayed based on the prediction of upcoming idle time of the host system. The internal operation may include garbage collection, data migration, or other tasks that involve access of the storage media. In some cases, the internal operations are triggered by respective thresholds, which may be suspended or preempted while the internal operations are delayed.

At 1508, media I/Os that correspond to host I/Os of the host system are performed while the internal operation of the storage system is delayed. The media I/Os performed may correspond to write commands or read commands of the host system. While the internal operation of the storage system is delayed, the media I/Os may be performed without competition from or contention with internal I/Os of the storage system. As such, the host I/O performance may be optimized be permitting the host system full access to the storage media (e.g., without throttling or stalling).

At 1510, other media I/Os that correspond to internal I/Os of the delayed internal operation are performed during the upcoming idle time. The internal I/Os may correspond to delayed data migration or delayed garbage collection that is performed during the idle time of the host system. In some cases, the delay is effective to prevent the data migration or garbage collection from degrading performance of host I/Os, such that host system access to the storage media is optimized.

Figure 16:
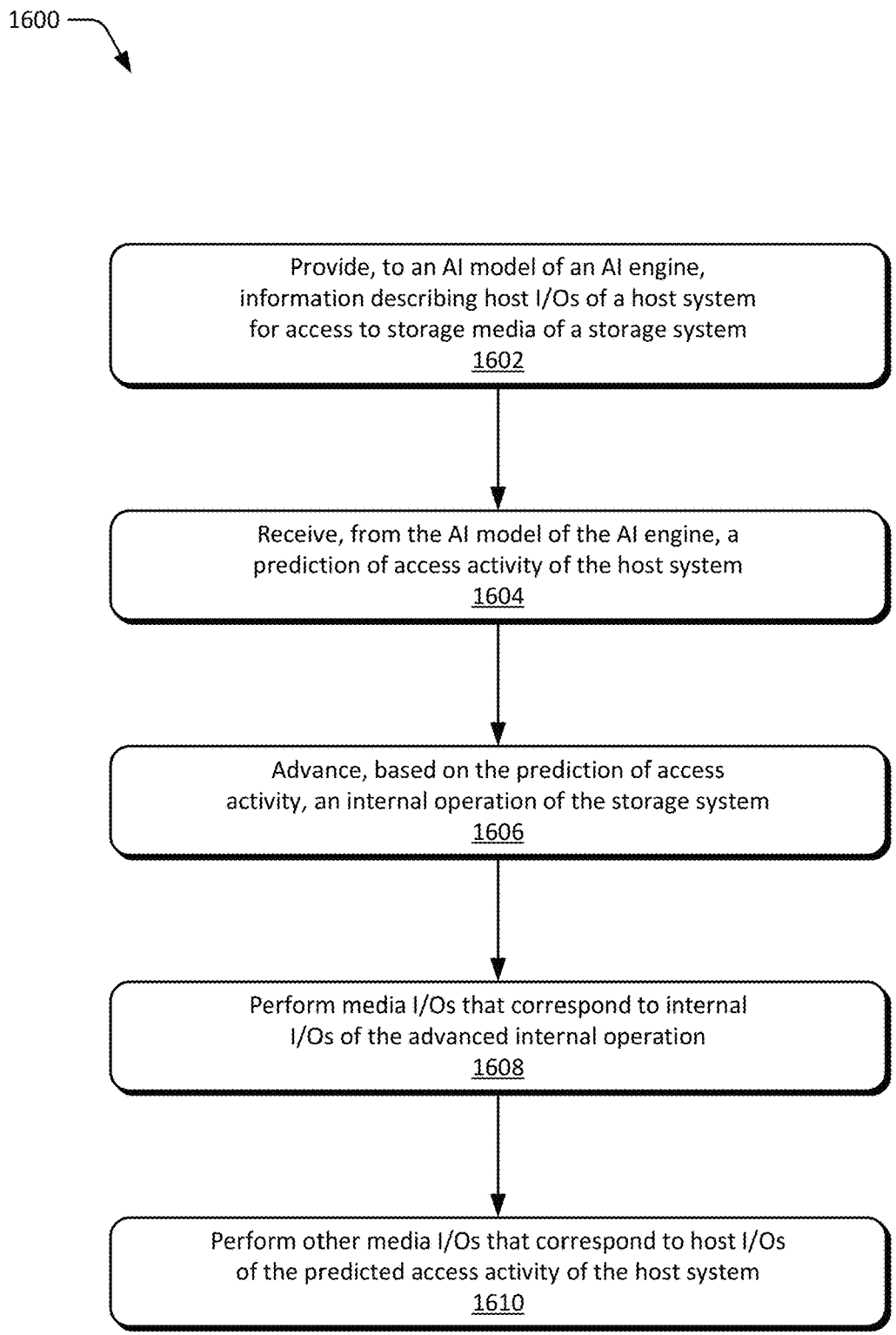
FIG. 16 depicts an example method for advancing an internal operation of a storage system based on a prediction of host system behavior.

FIG. 16 depicts an example method 1600 for advancing an internal operation of a storage system based on a prediction of host system behavior. In some aspects, the media access manager 130 or the AI engine 132 of a media storage controller perform the operations of the method 1600.

At 1602, information describing host I/Os of a host system are provided to an AI model of an AI engine. The host I/Os may include I/O commands or I/O operations for access to storage media of a storage system with which the AI engine is associated. In some cases, the information describing (or descriptors) of the host I/Os events includes an event type of the host I/O, an event duration of the host I/O, or an event size of data associated with the host I/O.

At 1604, a prediction of access activity of the host system is received from the AI model of the AI engine. The prediction of access activity may include a write density of the host system, an amount of data to be written to the storage media, or an expected duration of the write activity. In some cases, the prediction also includes an amount of time until the write activity occurs, such that the media access manager may determine whether other internal tasks may be performed before the predicted activity of the host system begins.

At 1606, an internal operation of the storage system is advanced based on the prediction of access activity of the host system. The internal operation may include garbage collection or data migration, such as to free space of a cache memory or increase the amount of free space beyond a nominal threshold for free space in the cache memory or storage media. For example, the internal operation may be advanced and configured to free up enough cache space to prevent the predicted activity of the host system from triggering internal operations while the activity occurs.

At 1608, media I/Os that correspond to internal I/Os of the advanced internal operation are performed. The media I/Os may correspond to advanced or anticipated garbage collection or data migration for a cache memory or storage media. In at least some cases, the advanced or predictive internal operations create enough free space in a cache memory or storage media to enable the host system activity without the activity triggering thresholds for additional internal operations.

At 1610, other media I/O that correspond to host I/Os of the predicted access activity of the host system are performed. After at least some of the media I/Os of the internal operations are performed, the media I/Os for the host I/Os are performed for storage media access. In some cases, the free space provided by the advanced internal operations enable the media I/Os that correspond to the host I/Os to be performed at a full level of host system access. As such, by advancing the internal operations of the storage system, host system access to the storage media may be optimized by preventing internal I/Os from competing with the host I/Os for access to the storage media.

Figure 17:
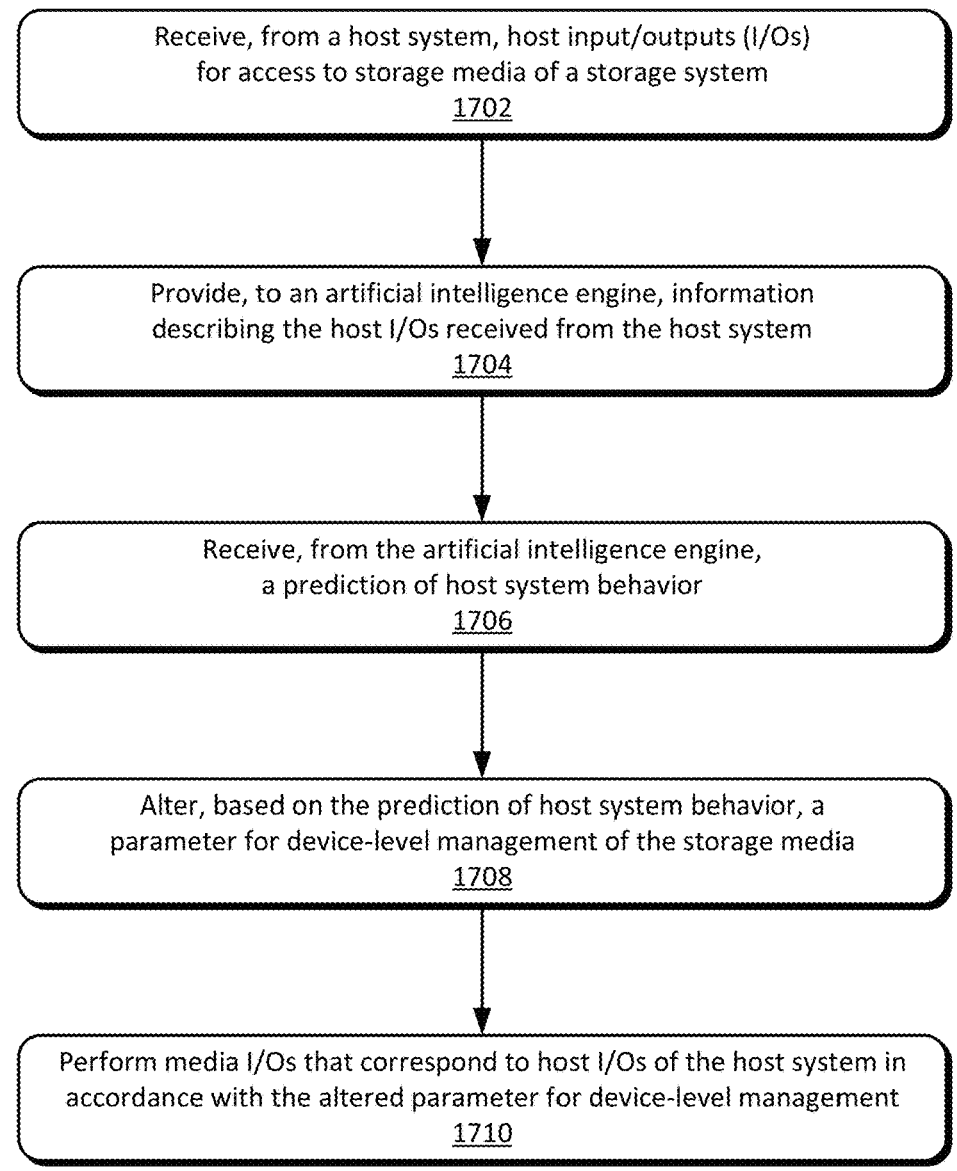
FIG. 17 depicts an example method for altering threshold for device-level management based on a prediction of host system behavior.

FIG. 17 depicts an example method 1700 for altering a parameter for device-level management of storage media based on a prediction of host system behavior. In some aspects, the media access manager 130 or the AI engine 132 of a media storage controller perform the operations of the method 1700.

At 1702, host I/Os for access to storage media are received from a host system. The host I/Os may be received from a host system via a host system interface of a storage system or storage controller. In some cases, the host I/Os include or correspond to write or read commands of the host system that include a respective logical block address, size, or timestamp.

At 1704, information describing the host I/Os are provided to an artificial intelligence engine. The AI engine may be associated with the storage system, as part of a storage controller or accessible by the storage controller of the storage system. In some cases, the information describing or descriptors of the host I/Os includes an event type of the host I/O, an event duration of the host I/O, or an event size of data associated with the host I/O.

At 1706, a prediction of host behavior is received from the artificial intelligence engine. The prediction of host system behavior may include information describing host system activity with respect to subsequent access of the storage media by the host system. In some cases, the prediction of host system behavior includes an indication of a duration of time until the host system becomes idle, a duration of time for which the host system will remain idle, or parameters regarding a next host I/O issued by the host system (e.g., write intensity).

At 1708, a parameter for device-level management of the storage media is altered based on the prediction of host system behavior. The parameter may include a threshold for thermal management of storage media devices. For example, based on an upcoming idle time, the media access manager may preempt or suspend a thermal limit to allow host I/Os for a data write to complete at full performance without thermal throttling access to the storage media. Alternately or additionally, a threshold for garbage collection or data migration may be preempted or suspended to allow full host I/O performance for an access operation.

Based on a prediction of upcoming idle time (no host system activity), the host system may be provided will full performance access knowing that the storage media devices will have sufficient time to cool after completion of the operation. In other cases, the media access manager may determine that a write operation will likely complete without running out of free space even if garbage collection or data migration is delayed until after the write operation (e.g., altering or suspending the thresholds for either).

At 1710, media I/Os that correspond to host I/Os of the host system are performed in accordance with the altered parameter for device-level management. The FTL of the storage controller may generate respective media I/Os that correspond to the scheduled host I/Os and the internal I/Os of the storage system. The media I/Os may be performed in accordance with an altered or suspended thermal limit for the storage media or storage media devices. Alternately or additionally, the media I/Os may be performed in accordance with an altered or suspended threshold for data migration or garbage collection.

Figure 18:
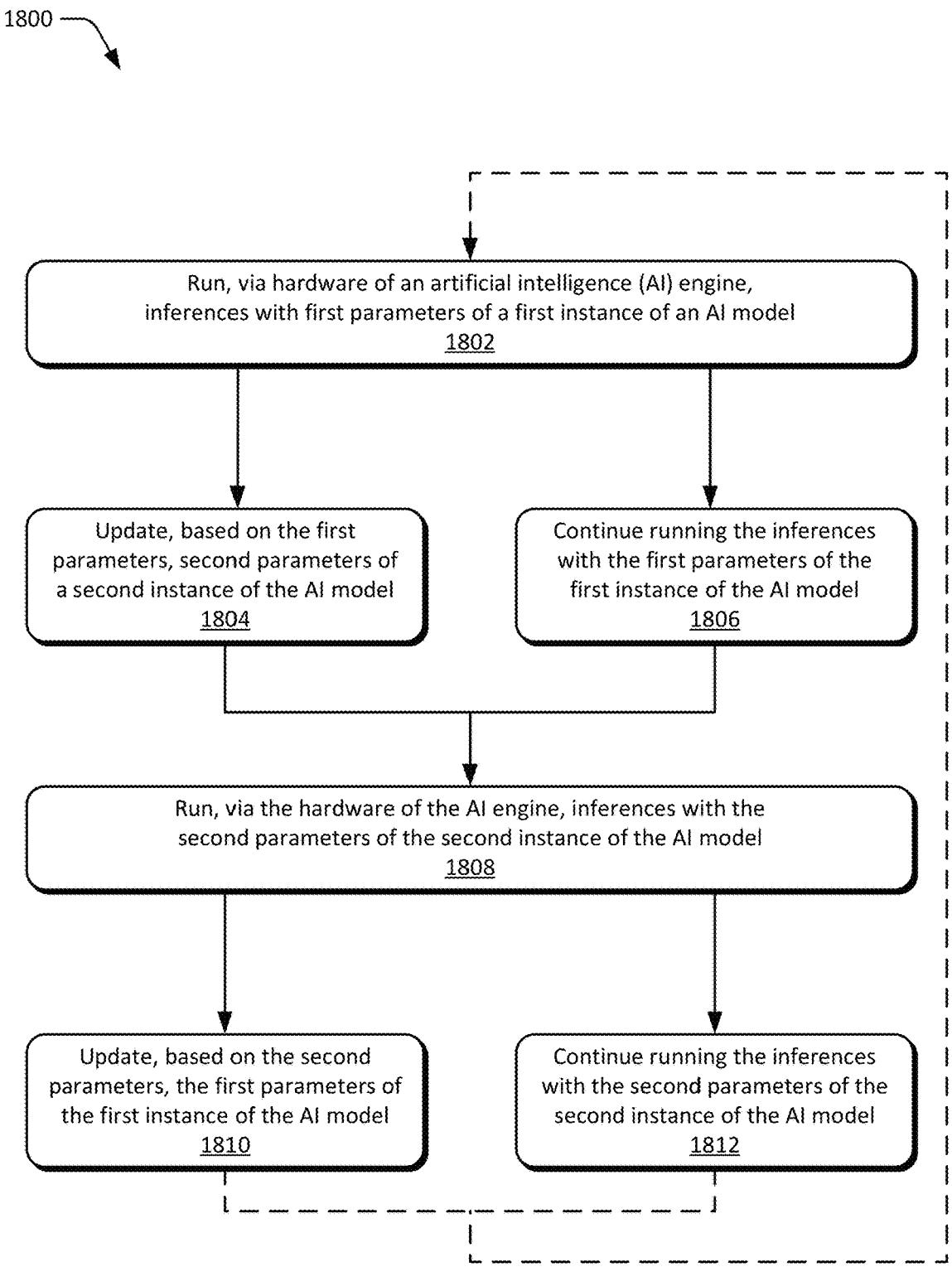
FIG. 18 depicts an example method for running inferences with multiple instances of an AI model to enable online re-training or refinement.

FIG. 18 depicts an example method 1800 for running inferences with multiple instances of an AI model to enable online retraining or refinement, including operations performed by or with the media access manager 130 of the storage system.

At 1802, inferences are run, via hardware of an AI engine, with first parameters of a first instance (e.g., respective weights or parameters) of an AI model. The first parameters may be stored to a first buffer or memory area. In some cases, the first instance of the AI model is a "current" instance of the AI model used to run inferences. The inferences may be run in parallel with an online training process that runs on the same hardware of the AI engine.

At 1804, second parameters of a second instance of the AI model are updated based on the first parameters of the first instance of the AI model. The second parameters may be stored to a second buffer or memory area. In some cases, the second instance of the AI model is an "update" instance of the AI model that is updated from the "current" instance running on the hardware. During the update of the second parameters of the second instance of the AI model, the online retraining process may be paused. At 1806, while the second parameters of the second instance are updated, the inferences continue to run with the first parameters of the first instance of the AI model.

At 1808, inferences are run, via the hardware of the AI engine, with the second parameters of the second instance of the AI model. The second instance of the AI model may become the "current" instance of the AI model used to run the inferences. The first instance of the AI model may become the "update" instance of the AI model that is updated from the "current" instance running on the hardware. The inferences may be run in parallel with an online training process that runs on the same hardware of the AI engine.

At 1810, the first parameters of the first instance of the AI model are updated based on the second parameters of the second instance of the AI model. During the update of the first parameters of the first instance of the AI model, the online retraining process may be paused. At 1812, while the first parameters of the first instance are updated, the inferences continue to run with the second parameters of the second instance of the AI model. From operation 1812, the method 1800 may return to operation 1802 to start another iteration of the online training process.

System-on-Chip

Figure 19:
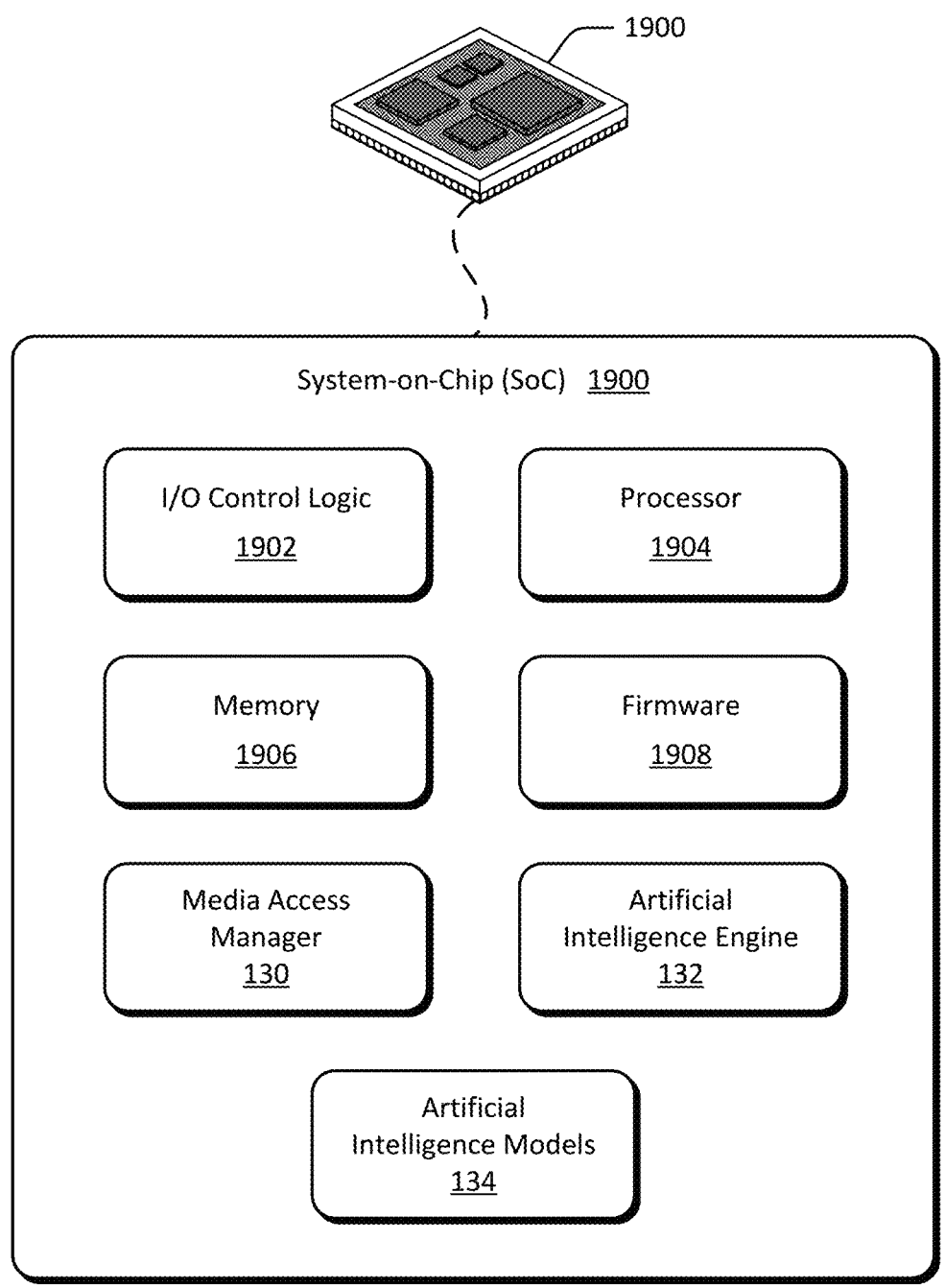
FIG. 19 illustrates an example System-on-Chip (SoC) environment in which aspects of AI-enabled management of storage media access may be implemented.

FIG. 19 illustrates an exemplary System-on-Chip (SoC) 1900 that may implement various aspects of AI-enabled management of storage media access. The SoC 1900 may be implemented in any suitable system or device, such as a smart-phone, netbook, tablet computer, access point, network-attached storage, camera, smart appliance, printer, set-top box, server, data center, solid-state drive (SSD), hard disk drive (HDD), storage drive array, memory module, automotive computing system, or any other suitable type of device (e.g., others described herein). Although described with reference to a SoC, the entities of FIG. 19 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 1900 may be integrated with electronic circuitry, a microprocessor, memory, input-output (I/O) control logic, communication interfaces, firmware, and/or software useful to provide functionalities of a computing device, host system, or storage system, such as any of the devices or components described herein (e.g., storage drive or storage array). The SoC 1900 may also include an integrated data bus or interconnect fabric (not shown) that couples the various components of the SoC for control signaling, data communication, and/or routing between the components. The integrated data bus, interconnect fabric, or other components of the SoC 1900 may be exposed or accessed through an external port, parallel data interface, serial data interface, fabric-based interface, peripheral component interface, or any other suitable data interface. For example, the components of the SoC 1900 may access or control external storage media, AI engines, AI models, or AI networks through an external interface or off-chip data interface.

In this example, the SoC 1900 includes various components such as input-output (I/O) control logic 1902 and a hardware-based processor 1904 (processor 1904), such as a microprocessor, processor core, application processor, DSP, or the like. The SoC 1900 also includes memory 1906, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1904 and code stored on the memory 1906 are implemented as a storage system controller or storage aggregator to provide various functionalities associated with AI-enabled management of storage media access. In the context of this disclosure, the memory 1906 stores data, code, instructions, or other information via non-transitory signals, and does not include carrier waves or transitory signals. Alternately or additionally, SoC 1900 may comprise a data interface (not shown) for accessing additional or expandable off-chip storage media, such as solid-state memory (e.g., Flash or NAND memory), magnetic-based memory media, or optical-based memory media.

The SoC 1900 may also include firmware 1908, applications, programs, software, and/or operating system, which may be embodied as processor-executable instructions maintained on the memory 1906 for execution by the processor 1904 to implement functionalities of the SoC 1900. The SoC 1900 may also include other communication interfaces, such as a transceiver interface for controlling or communicating with components of a local on-chip (not shown) or off-chip communication transceiver. Alternately or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 1900. For example, the SoC 1900 may include a transceiver interface configured to enable storage over a wired or wireless network, such as to provide a network attached storage (NAS) volume with AI-enabled management of storage media access.

The SoC 1900 also includes a media access manager 130, AI engine 132, and AI models 134, which may be implemented separately as shown or combined with a storage component, data interface, or accessible through an off-chip interface (e.g., AI models stored to external memory). In accordance with various aspects of AI-enabled management of storage media access, the media access manager 130 may interact with the AI engine 132 to generate a prediction of host behavior with respect to future storage media access and schedule, based on the prediction, internal operations (e.g., internal task I/Os) to optimize storage media performance. Alternately or additionally, the AI engine 132 may implement multiple AI models 134 to predict host behavior, which may be executed concurrently and/or with online refinement or retraining for improved prediction of host-specific behavior. Any of these entities may be embodied as disparate or combined components, as described with reference to various aspects presented herein. Examples of these components and/or entities, or corresponding functionality, are described with reference to the respective components or entities of the environment 100 of FIG. 1 or respective configurations illustrated in FIG. 2 through FIG. 13. The media access manager 130 or AI engine 132, either in whole or part, may be implemented as processor-executable instructions maintained by the memory 1906 and executed by the processor 1904 to implement various aspects and/or features of AI-enabled management of storage media access.

The media access manager 130, may be implemented independently or in combination with any suitable component or circuitry to implement aspects described herein. For example, the media access manager 130 or AI engine 132 may be implemented as part of a DSP, processor/storage bridge, I/O bridge, graphics processing unit, memory controller, storage controller, arithmetic logic unit (ALU), or the like. The media access manager 130 may also be provided integral with other entities of SoC 1900, such as integrated with the processor 1904, memory 1906, a storage media interface, or firmware 1908 of the SoC 1900. Alternately or additionally, the media access manager 130, AI engine 132, and/or other components of the SoC 1900 may be implemented as hardware, firmware, fixed logic circuitry, or any combination thereof.

Figure 20:
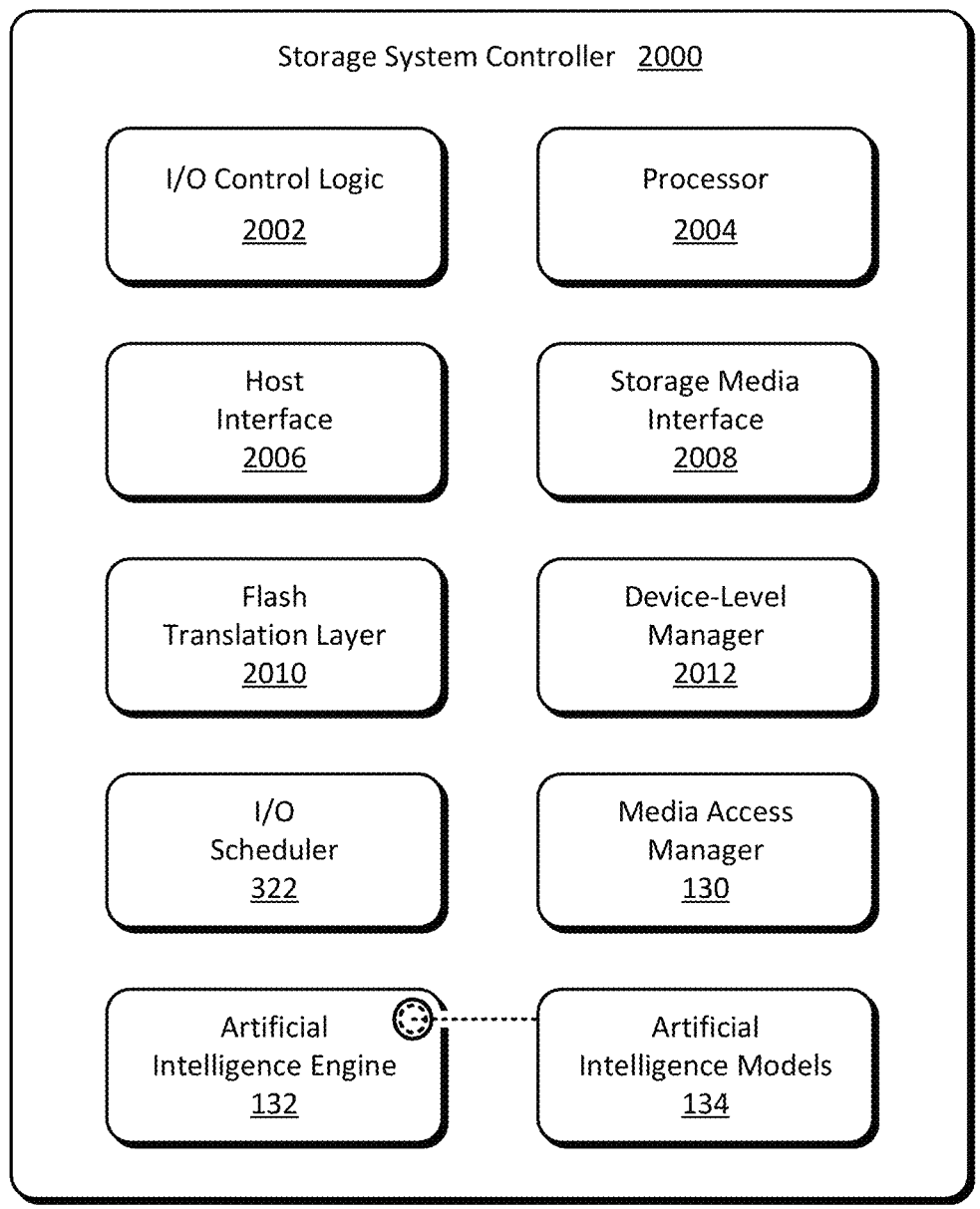
FIG. 20 illustrates an example storage system controller in which an AI engine is implemented in accordance with one or more aspects of the disclosure.

As another example, consider FIG. 20 which illustrates an example storage system controller 2000 in accordance with one or more aspects of AI-enabled management of storage media access. In various aspects, the storage system controller 2000 or any combination of components thereof may be implemented as a storage drive controller, storage media controller, NAS controller, Fabric interface, NVMe target, or storage aggregation controller for solid-state storage media. In some cases, the storage system controller 2000 is implemented similar to or with components of the SoC 1900 as described with reference to FIG. 19. In other words, an instance of the SoC 1900 may be configured as a storage system controller, such as the storage system controller 2000 to manage solid-state (e.g., NAND Flash-based) media with AI assistance.

In this example, the storage system controller 2000 includes input-output (I/O) control logic 2002 and a processor 2004, such as a microprocessor, processor core, application processor, DSP, or the like. In some aspects, the processor 2004 and firmware of the storage system controller 2000 may be implemented to provide various functionalities associated with AI-enabled management of storage media access, such as those described with reference to any of methods 1400 through 1800. The storage system controller 2000 also includes a host interface 2006 (e.g., SATA, PCIe, NVMe, or Fabric interface) and a storage media interface 2008 (e.g., NAND interface), which enable access to a host system and storage media, respectively. The storage system controller 2000 also includes a Flash translation layer 2010 (FTL 2010), device-level manager 2012, and I/O scheduler 322. In some aspects of AI-enabled management of storage media access, the FTL 2010 and/or device-level manager 2012 generate internal I/Os of the storage system controller or manage storage media devices through the storage media interface 2008.

The storage system controller 2000 also includes instances of a media access manager 130, AI engine 132, and AI models 134. Any or all of these components may be implemented separately as shown or combined with the processor 2004, host interface 2006, storage media interface 2008, Flash translation layer 2010, device-level manager 2012, and/or I/O scheduler 322. Examples of these components and/or entities, or corresponding functionality, are described with reference to the respective components or entities of the environment 100 of FIG. 1 or respective configurations illustrated in FIG. 2 through FIG. 13. In accordance with various aspects of AI-enabled management of storage media access, the media access manager 130 may interact with the AI engine 132 of the storage system controller 2000 to generate a prediction of host behavior with respect to future storage media access and schedule, based on the prediction, internal operations (e.g., internal task I/Os) to optimize storage media performance. Alternately or additionally, the AI engine 132 may implement multiple AI models 134 to predict host behavior, which may be executed concurrently and/or with online refinement or retraining for improved prediction of host-specific behavior. The media access manager 130, either in whole or part, may be implemented as processor-executable instructions maintained by memory of the controller and executed by the processor 2004 to implement various aspects and/or features of AI-enabled management of storage media access.

Although the subject matter has been described in language specific to structural features and/or methodological operations, it is to be understood that the subject matter defined in the appended claims is not necessarily limited to the specific examples, features, or operations described herein, including orders in which they are performed.

In the following, some examples are described:

Example 1: A method for artificial intelligence-enabled management of storage media access, comprising:

receiving, from a host system and via a host interface of a storage system, host input/outputs (I/Os) for access to storage media of the storage system;

providing, to an artificial intelligence engine associated with the storage system, information describing the host I/Os received from the host system;

receiving, from the artificial intelligence engine, a prediction of host system behavior with respect to subsequent access of the storage media by the host system; and scheduling, based on the prediction of host system behavior, the host I/Os for access to the storage media of the storage system.

Example 2: The method of claim 1, further comprising:
determining that the storage system has internal I/Os that are pending, and wherein the scheduling comprises:
scheduling, based on the prediction of host system behavior, the host I/Os of the host system and the internal I/Os of the storage system for access to the storage media of the storage system.

Example 3: The method of claim 2, wherein scheduling the internal I/Os of the storage system comprises advancing or delaying the internal I/Os of the storage system based on the prediction of host system behavior to mitigate contention between the internal I/Os and the host I/Os or subsequent host I/Os for access to the storage media.

Example 4: The method of claim 2, wherein the internal I/Os correspond to one or more tasks of a Flash translation layer of the storage system that includes one of garbage collection, data migration, or wear leveling.

Example 5: The method of claim 1, wherein the prediction of host system behavior received from the artificial intelligence engine comprises an indication of:
a duration of time until the host system becomes idle;
a duration of time for which the host system will remain idle; or
parameters regarding a next host I/O issued by the host system.

Example 6: The method of claim 1, wherein the information describing the host I/Os comprises, for at least one of the host I/Os, an indication of:
an event type of the host I/O;
an event duration of the host I/O; or
an event size of data associated with the host I/O.

Example 7: The method of claim 1, wherein the scheduling of the host I/Os is based on the prediction of host system behavior received from the artificial intelligence engine and device-level parameters of the storage media for thermal management of the storage media.

Example 8: The method of claim 1, wherein:
the artificial intelligence engine executes multiple artificial intelligence models;
at least two of the multiple artificial intelligence models are associated with respective internal tasks implemented by a Flash translation layer or device-level manager of the storage system; and
the method further comprises loading, prior to providing the information to the artificial intelligence engine, at least one of the multiple intelligence models to the artificial intelligence engine to enable the prediction of the host system behavior.

Example 9: The method of claim 8, further comprising executing, via the artificial intelligence engine, the at least two of the multiple artificial intelligence models concurrently to implement at least two artificial intelligence-assisted internal tasks of the storage system.

Example 10: The method of claim 8, further comprising executing, via the artificial intelligence engine, two instances of one of the multiple artificial intelligence models in parallel to enable online re-training or refinement of the artificial intelligence model.

Example 11: An apparatus comprising:
a host interface configured for communication with a host system;
storage media to store data of the host system;
a media interface configured to enable access to the storage media;
an artificial intelligence engine; and
a media access manager configured to:
receive, via the host interface, host input/outputs (I/Os) from the host system for access to the storage media of the apparatus;
provide, to the artificial intelligence engine, information describing the host I/Os received from the host system;
receive, from the artificial intelligence engine, a prediction of host system behavior with respect to subsequent access of the storage media by the host system; and
schedule, based on at least the prediction of host system behavior, the host I/Os for access to the storage media of the apparatus.

Example 12: The apparatus of claim 11, wherein the media access manager is further configured to:
determine that the apparatus has internal I/Os for access to the storage media that are pending; and
schedule, based on the prediction of host system behavior, the host I/Os of the host system and the internal I/Os of the apparatus for access to the storage media of the apparatus.

Example 13: The apparatus of claim 11, wherein:
the prediction of host system behavior received from the artificial intelligence engine comprises an indication of at least one of a duration of time until the host system becomes idle, a duration of time for which the host system will remain idle, or parameters regarding a next host I/O issued by the host system; or
the information describing the host I/Os comprises, for at least one of the host I/Os, an indication of an event type of the host I/O, an event duration of the host I/O, or an event size of data associated with the host I/O.

Example 14: The apparatus of claim 11, wherein:
the artificial intelligence engine executes multiple artificial intelligence models that include at least two of the multiple artificial intelligence models are associated with respective internal tasks implemented by a Flash translation layer or device-level manager of the apparatus; and
the media access manager is further configured to load, prior to providing the information to the artificial intelligence engine, at least one of the multiple intelligence models to the artificial intelligence engine to enable the prediction of the host system behavior.

Example 15: The apparatus of claim 14, wherein the media access manager is further configured to:
cause the artificial intelligence engine to execute the at least two of the multiple artificial intelligence models concurrently to implement at least two artificial intelligence-assisted internal tasks of the apparatus; or
cause the artificial intelligence engine to execute two instances of one of the multiple artificial intelligence models in parallel to enable online re-training or refinement of the artificial intelligence model.

Example 16: A System-on-Chip (SoC) comprising:
a media interface to access storage media of a storage system;
a host interface to communicate with a host system;
an artificial intelligence engine;
a hardware-based processor;
a memory storing processor-executable instructions that, responsive to execution by the hardware-based processor, implement a media access manager to:
receive, via the host interface, host input/outputs (I/Os) from the host system for access to the storage media of the storage system;
provide, to the artificial intelligence engine, information describing the host I/Os received from the host system;

receive, from the artificial intelligence engine, a prediction of host system behavior with respect to subsequent access of the storage media by the host system; and schedule, based on at least the prediction of host system behavior, the host I/Os for access to the storage media of the storage system.

Example 17: The SoC of claim 16, wherein the media access manager is further configured to determine that the SoC has internal I/Os for access to the storage media that are pending; and schedule, based on the prediction of host system behavior, the host I/Os of the host system and the internal I/Os of the SoC for access to the storage media of the SoC, the scheduling of the internal I/Os comprising advancing or delaying the internal I/Os of the SoC to mitigate contention between the internal I/Os and the host I/Os.

Example 18: The SoC of claim 16, wherein:

the prediction of host system behavior received from the artificial intelligence engine comprises an indication of at least one of a duration of time until the host system becomes idle, a duration of time for which the host system will remain idle, or parameters regarding a next host I/O issued by the host system; or the information describing the host I/Os comprises, for at least one of the host I/Os, an indication of an event type of the host I/O, an event duration of the host I/O, or an event size of data associated with the host I/O.

Example 19: The SoC of claim 16, the media access manager is further configured to schedule the host I/Os based on the prediction of host system behavior and device-level parameters of the storage media for thermal management of the storage media.

Example 20: The SoC of claim 16, wherein:

the artificial intelligence engine of the SoC executes multiple artificial intelligence models that include at least two of the multiple artificial intelligence models associated with respective internal tasks implemented by a Flash translation layer or device-level manager of the SoC; and the media access manager is further configured to:

cause the artificial intelligence engine to execute the at least two of the multiple artificial intelligence models concurrently to implement at least two artificial intelligence-assisted internal tasks of the SoC; or cause the artificial intelligence engine to execute two instances of one of the multiple artificial intelligence models in parallel to enable online re-training or refinement of the artificial intelligence model.

What is claimed is:

1. A method for artificial intelligence-enabled management of storage media access, comprising:

receiving, at a storage media controller, multiple host input/outputs (I/Os) from a host system for access to storage media coupled to the storage media controller;

providing, to an artificial intelligence engine associated with the storage media controller, respective information for individual host I/Os of the multiple host I/Os that describes at least an access-type of a host I/O and an amount of data associated with the host I/O;

receiving, from the artificial intelligence engine and based on the respective information for the individual host I/Os, a prediction of future host system idle time relating to completion of the multiple host I/Os or issuance of a next host I/O by the host system;

altering, based on the prediction of future host system idle time provided by the artificial intelligence engine, a threshold of a media translation layer of the storage media controller for implementing a storage media management operation for the storage media; and performing, by the storage media controller, a storage media management operation for the storage media in accordance with the altered threshold to mitigate contention between media I/Os issued to the storage media that correspond to the storage media management operation and other media I/Os issued to the storage media that correspond to at least one of (i) the multiple host I/Os received from the host system or (ii) the next host I/O issued by the host system.

2. The method of claim 1, wherein the providing the respective information for the individual host I/Os to the artificial intelligence engine further comprises one of:

providing respective information that describes a logical block address for access requested by the host I/O;

providing respective information that describes a duration of time associated with processing a host I/O; or providing respective information that describes a time at which the host I/O is received from the host system.

3. The method of claim 1, wherein the receiving the prediction of the future host system idle time from the artificial intelligence engine further comprises one of:

receiving a duration of time that is predicted to lapse before completion of the at least one of the multiple host I/Os;

receiving a duration of time that is predicted to lapse before the host system enters an idle state after completion of the multiple host I/Os;

receiving a duration of time for which the host system is predicted to remain idle after completion of the multiple host I/Os; or receiving predicted parameters for the next host I/O issued by the host system.

4. The method of claim 1, wherein:

the storage media management operation of the media translation layer comprises data migration from a cache memory of the storage media controller to the storage media;

the altering of the threshold comprises increasing, based on the prediction of future host system idle time, a cache memory threshold for performing the data migration from the cache memory to the storage media, and the method further comprises:

delaying, by the media translation layer and based on the increased cache memory threshold, performance of the data migration from the cache memory to the storage media until completion of some of the media I/Os that correspond to the multiple host I/Os to mitigate contention between media I/Os that correspond to the data migration and the other media I/Os that correspond to the multiple host I/Os.

5. The method of claim 1, wherein:

the storage media management operation of the media translation layer comprises a garbage collection operation for the storage media;

the altering of the threshold comprises increasing, based on the prediction of future host system idle time, a threshold for performing the garbage collection for the storage media, and the method further comprises:

delaying, by the media translation layer and based on the increased threshold for performing the garbage collection, performance of the garbage collection until completion of some of the media I/Os that correspond to the multiple host I/Os to mitigate contention between media I/Os that correspond to the garbage collection and the other media I/Os that correspond to the multiple host I/Os.

6. The method of claim 1, further comprising:
receiving, from the artificial intelligence engine and based on the respective information, a prediction of future host system access activity associated with at least the next host I/O issued by the host system; and
altering the threshold based on the prediction of future host system idle time and the prediction of future host system I/O activity provided by the artificial intelligence engine.

7. The method of claim 6, wherein:
the storage media management operation of the media translation layer comprises a garbage collection operation for the storage media;
the altering of the threshold comprises decreasing, based on the prediction of future host system idle time and the prediction of future host system I/O activity, a threshold for performing the garbage collection for the storage media, and the method further comprises:
performing, by the media translation layer and based on the decreased threshold for performing the garbage collection, the garbage collection operation for the storage media prior to issuance the next host I/O by the host system to mitigate contention between media I/Os that correspond to the garbage collection and the other media I/O that corresponds to the next host I/O issued by the host system.

8. The method of claim 6, wherein:
the storage media management operation of the media translation layer comprises data migration from a cache memory of the storage media controller to the storage media;
the altering of the threshold comprises decreasing, based on the prediction of future host system idle time and the prediction of future host system I/O activity, a cache memory threshold for performing the data migration from the cache memory to the storage media, and the method further comprises:
performing, by the media translation layer and based on the altered cache memory threshold for performing the data migration, the data migration from the cache memory to the storage media prior to issuance of the next host I/O by the host system to mitigate contention between media I/Os that correspond to the data migration and the other media I/O that corresponds to the next host I/O issued by the host system.

9. The method of claim 6, wherein:
the storage media management operation of the media translation layer comprises data migration from a cache memory of the storage media controller to the storage media;
the altering of the threshold comprises disregarding, based on the prediction of future host system idle time and the prediction of future host system I/O activity, a cache memory threshold for performing the data migration from the cache memory to the storage media, and the method further comprises:
writing, by the media translation layer and in response to disregarding the cache memory threshold, data associated with the multiple host I/Os directly to the storage media to bypass the cache memory to delay performance of a subsequent data migration to mitigate contention between media I/Os that correspond to the subsequent data migration and the other media I/O that corresponds to the next host I/O issued by the host system.

10. A method for artificial intelligence-enabled management of storage media access, comprising:
receiving, at a storage media controller, multiple host input/outputs (I/Os) from a host system for access to storage media coupled to the storage media controller;
providing, to an artificial intelligence engine associated with the storage media controller, respective information for individual host I/Os of the multiple host I/Os that describes at least an access-type of a host I/O and a duration of time associated processing host I/O;
receiving, from the artificial intelligence engine and based on the respective information, a prediction of future host system idle time that will occur after the multiple host I/Os are expected to complete or before an expected issuance of a next host I/O by the host system;
altering, based on the prediction of future host system idle time provided by the artificial intelligence engine, a threshold of a media translation layer for implementing a storage media management operation for the storage media; and
performing, by the media translation layer, a storage media management operation for the storage media in accordance with the altered threshold to mitigate contention between media I/Os issued to the storage media that correspond to the storage media management operation and other media I/Os issued to the storage media that correspond to at least one of (i) the multiple host I/Os received from the host system or (ii) the next host I/O issued by the host system.

11. The method of claim 10, wherein the providing the respective information for the individual host I/Os to the artificial intelligence engine further comprises one of:
providing respective information that describes a logical block address for access requested by the host I/O;
providing respective information that describes an amount of data associated with the host I/O; or
providing respective information that describes a time at which the host I/O is received from the host system.

12. The method of claim 10, wherein receiving the prediction of the future host system idle time from the artificial intelligence engine comprises one of:
receiving a duration of time that is predicted to lapse before completion of the at least one of the multiple host I/Os;
receiving a duration of time that is predicted to lapse before the host system enters an idle state after completion of the multiple host I/Os;
receiving a duration of time for which the host system is predicted to remain idle after completion of the multiple host I/Os; or
receiving predicted parameters for the next host I/O issued by the host system.

13. The method of claim 10, wherein:
the storage media management operation of the media translation layer comprises data migration from a cache memory of the storage media controller to the storage media;
the altering of the threshold comprises increasing, based on the prediction of future host system idle time, a cache memory threshold for performing the data migration from the cache memory to the storage media, and the method further comprises:
delaying, by the media translation layer and based on the increased cache memory threshold, performance of the data migration from the cache memory to the storage media until completion of some of the media I/Os that correspond to the multiple host I/Os to mitigate contention between media I/Os that correspond to the data migration and the media I/Os that correspond to the multiple host I/Os.

14. The method of claim 10, wherein:
the storage media management operation of the media translation layer comprises a garbage collection operation for the storage media;
the altering of the threshold comprises increasing, based on the prediction of future host system idle time, a threshold for performing the garbage collection for the storage media, and the method further comprises:
delaying, by the media translation layer and based on the increased threshold for performing the garbage collection, performance of the garbage collection until completion of some of the media I/Os that correspond to the multiple host I/Os to mitigate contention between media I/Os that correspond to the garbage collection and the media I/Os that correspond to the multiple host I/Os.

15. An apparatus comprising:
a media interface configured to access storage media of a storage system;
a host interface configured to communicate with a host system;
an artificial intelligence engine;
a hardware-based processor;
a memory storing processor-executable instructions that, responsive to execution by the hardware-based processor, implement an artificial intelligence-enabled (AI-enabled) storage controller to:
receive, from the host system, multiple host input/outputs (I/Os) for access to the storage media coupled to the media interface;
provide, to the artificial intelligence engine, respective information for individual host I/Os of the multiple host I/Os that describes at least an access-type of a host I/O and an amount of data associated with the host I/O;
receive, from the artificial intelligence engine and based on the respective information, a prediction of future host system idle time relating to completion of the multiple host I/Os or issuance of a next host I/O by the host system;
alter, based on the prediction of future host system idle time provided by the artificial intelligence engine, a threshold of a media translation layer of the AI-enabled storage controller for implementing a storage media management operation for the storage media; and
perform a storage media management operation for the storage media in accordance with the altered threshold to mitigate contention between media I/Os issued to the storage media that correspond to the storage media management operation and other media I/Os issued to the storage media that correspond to at least one of (i) the multiple host I/Os received from the host system or (ii) the next host I/O issued by the host system.

16. The apparatus of claim 15, wherein the AI-enabled storage controller is further implemented to provide to the artificial intelligence as part of the respective information for the individual host I/Os one of:
respective information that describes a logical block address for access requested by the host I/O;
respective information that describes a duration of time associated processing host I/O; or
respective information that describes a time at which the host I/O is received from the host system.

17. The apparatus of claim 15, wherein the artificial intelligence engine of the apparatus is configured to define as part of the prediction of future host system idle time one of:
a duration of time that is predicted to lapse before completion of the at least one of the multiple host I/Os;
a duration of time that is predicted to lapse before the host system enters an idle state after completion of the multiple host I/Os;
a duration of time for which the host system is predicted to remain idle after completion of the multiple host I/Os; or
predicted parameters for the next host I/O issued by the host system.

18. The apparatus of claim 15, further comprising a cache memory configured to buffer data associated with the multiple host I/Os, and wherein:
the storage media management operation of the media translation layer comprises data migration from the cache memory to the storage media, the threshold of the media translation layer is a cache memory threshold for performing the data migration; and the media translation layer is further implemented to:
increase, based on the prediction of future host system idle time, the cache memory threshold for performing the data migration from the cache memory to the storage media;
delay, based on the increased cache memory threshold, performance of the data migration from the cache memory to the storage media until completion of some of the media I/Os that correspond to the multiple host I/Os to mitigate contention between media I/Os that correspond to the data migration and the media I/Os that correspond to the multiple host I/Os.

19. The apparatus of claim 15, wherein:
the memory of the apparatus also stores processor-executable instructions configured to implement artificial intelligence models of the artificial intelligence engine; or
the apparatus further comprises another memory operably coupled to the artificial intelligence engine, the other memory storing the processor-executable instructions configured to implement artificial intelligence models of the artificial intelligence engine.

20. The apparatus of claim 15, further comprising:
the storage media that is coupled to the media interface of the apparatus; and
wherein the apparatus is embodied as part of the storage media system or a storage media drive of the storage media system.

* * * * *